(12) United States Patent
Laricchiuta et al.

(10) Patent No.: US 11,016,003 B2
(45) Date of Patent: May 25, 2021

(54) SYSTEMS AND METHODS FOR DETECTION AND ANALYSIS OF FAULTY COMPONENTS IN A ROTATING PULLEY SYSTEM

(71) Applicant: EZ PULLEY LLC, Northport, NY (US)

(72) Inventors: Lawrence Andrew Laricchiuta, Farmingville, NY (US); Joseph M. Ambrosio, Smithtown, NY (US); Michael J. Kuhl, Smithtown, NY (US); John O'Brien, Smithtown, NY (US); Joshua I. Romero, Smithtown, NY (US); George Jacob, Smithtown, NY (US); Steven Massaro, Smithtown, NY (US)

(73) Assignee: EZ PULLEY LLC, Northport, NY (US)

(*) Notice: Subject to any disclaimer, the term of this patent is extended or adjusted under 35 U.S.C. 154(b) by 291 days.

(21) Appl. No.: 16/173,346

(22) Filed: Oct. 29, 2018

(65) Prior Publication Data

US 2019/0064032 A1    Feb. 28, 2019

Related U.S. Application Data

(63) Continuation-in-part of application No. PCT/US2017/062403, filed on Nov. 17, 2017.
(Continued)

(51) Int. Cl.
*G01M 13/021* (2019.01)
*G01M 13/045* (2019.01)
(Continued)

(52) U.S. Cl.
CPC .......... *G01M 13/021* (2013.01); *G01H 1/003* (2013.01); *G01M 13/045* (2013.01); *G01H 1/14* (2013.01); *G01M 13/028* (2013.01)

(58) Field of Classification Search
CPC .............. G01M 13/021; G01M 13/045; G01M 13/028; G01M 15/12; G01H 1/003; G01H 1/14
See application file for complete search history.

(56) References Cited

U.S. PATENT DOCUMENTS 4,262,538 A    4/1981  Otawara
4,352,293 A    10/1982 Kurihara et al.
(Continued)

FOREIGN PATENT DOCUMENTS

CN    102192825 A    9/2011
CN    106226074 B    8/2017
(Continued)

OTHER PUBLICATIONS

International Search Report issued for PCT Application No. PCT/US17/62403 dated Feb. 14, 2018.
(Continued)

*Primary Examiner* — David Z Huang

(57) ABSTRACT

A vibration monitoring system described herein is used to detect and analyze mechanical characteristics such as vibrations emanating from a rotating system (including the shaft and bearing system). The analysis of the mechanical characteristics yields decision data as to whether and which component connected with the rotating system is faulty so that it may be replaced. An example of a rotating system would be any of the rotating accessories present in an automotive vehicle.

4 Claims, 20 Drawing Sheets

Related U.S. Application Data

(60) Provisional application No. 62/423,479, filed on Nov. 17, 2016, provisional application No. 62/577,927, filed on Oct. 27, 2017.

(51) Int. Cl.
*G01H 1/00* (2006.01)
*G01H 1/14* (2006.01)
*G01M 13/028* (2019.01)

(56) References Cited

U.S. PATENT DOCUMENTS

| | | |
|---|---|---|
| 4,408,294 A | 10/1983 | Imam |
| 4,425,798 A | 1/1984 | Nagai et al. |
| 4,429,578 A | 2/1984 | Darrel et al. |
| 4,435,770 A | 3/1984 | Shiohata et al. |
| 4,453,407 A | 6/1984 | Sato et al. |
| RE31,750 E | 11/1984 | Morrow |
| 4,493,042 A | 1/1985 | Shima et al. |
| 4,646,754 A | 3/1987 | Seale |
| 4,763,523 A | 8/1988 | Womble et al. |
| 4,790,190 A | 12/1988 | Bambara et al. |
| 4,980,844 A | 12/1990 | Demjanenko et al. |
| 5,109,700 A | 5/1992 | Hicho |
| 5,115,671 A | 5/1992 | Hicho |
| 5,140,858 A | 8/1992 | Nishimoto et al. |
| 5,150,618 A | 9/1992 | Bambara |
| 5,187,434 A | 2/1993 | Ando |
| 5,210,704 A | 5/1993 | Husseiny |
| 5,381,692 A | 1/1995 | Winslow et al. |
| 5,419,197 A | 5/1995 | Ogi et al. |
| 5,477,730 A | 12/1995 | Carter |
| 5,495,764 A | 3/1996 | Matsuzaki et al. |
| 5,533,400 A | 7/1996 | Gasch et al. |
| 5,544,073 A | 8/1996 | Piety et al. |
| 5,602,757 A | 2/1997 | Haseley et al. |
| 5,610,339 A | 3/1997 | Haseley et al. |
| 5,800,331 A | 9/1998 | Song |
| 5,811,683 A | 9/1998 | Yoshioka et al. |
| 5,852,351 A | 12/1998 | Canada et al. |
| 5,852,793 A | 12/1998 | Board |
| 5,889,218 A | 3/1999 | Sato et al. |
| 5,895,857 A | 4/1999 | Robinson |
| 5,922,963 A | 7/1999 | Piety et al. |
| 5,929,336 A | 7/1999 | Belanger et al. |
| 5,995,910 A | 11/1999 | Discenzo |
| 5,998,894 A | 12/1999 | Raad |
| 6,053,047 A | 4/2000 | Dister |
| 6,116,089 A | 9/2000 | El-Ibiary |
| 6,289,735 B1 | 9/2001 | Dister |
| 6,363,303 B1 | 3/2002 | Bertness |
| 6,370,957 B1 | 4/2002 | Filippenko |
| 6,560,552 B2 | 5/2003 | Shen |
| 6,711,952 B2 | 3/2004 | Leamy |
| 6,789,422 B1 | 9/2004 | Ward |
| 6,889,553 B2 | 5/2005 | Robinson |
| 6,980,910 B1 | 12/2005 | Shen |
| 7,027,953 B2 | 4/2006 | Klein |
| 7,065,469 B2 | 6/2006 | Samata |
| 7,124,637 B2 | 10/2006 | Singhal |
| 7,231,303 B2 | 6/2007 | Griessler et al. |
| 7,526,943 B2 | 5/2009 | Cubr |
| 7,756,649 B2 | 7/2010 | Baehr |
| 8,478,548 B2 | 7/2013 | Hudson |
| 8,665,101 B2 | 3/2014 | Solomon |
| 8,924,163 B2 | 12/2014 | Hudson |
| 8,963,733 B2 | 2/2015 | Kar et al. |
| 9,032,803 B2 | 5/2015 | Griffaton |
| 9,091,588 B2 | 7/2015 | Lefler |
| 9,188,498 B2 | 11/2015 | Sprague |
| 9,376,263 B2 | 6/2016 | Nancarrow |
| 9,429,092 B2 | 8/2016 | Rosero |
| 9,530,258 B2 | 12/2016 | Bell |
| 9,835,594 B2 | 12/2017 | Yoskovitz |
| 2004/0139803 A1 | 7/2004 | Robinson et al. |
| 2007/0063048 A1 | 3/2007 | Havens et al. |
| 2009/0108205 A1 | 4/2009 | Duffy et al. |
| 2009/0248326 A1 | 10/2009 | Greening |
| 2011/0288796 A1 | 11/2011 | Peczalski et al. |
| 2012/0330577 A1 | 12/2012 | Kar |
| 2013/0162810 A1 | 6/2013 | Wu |
| 2014/0116124 A1 | 5/2014 | Ma |
| 2014/0174186 A1 | 6/2014 | Salomon |
| 2015/0106041 A1 | 4/2015 | Bess et al. |
| 2015/0127272 A1 | 5/2015 | Sundquist |
| 2016/0005246 A1* | 1/2016 | Baker ............... F16D 3/41 701/29.1 |
| 2016/0071336 A1* | 3/2016 | Owen ............... G07C 5/008 701/31.4 |
| 2017/0010173 A1 | 1/2017 | Bizub |
| 2017/0131172 A1 | 5/2017 | Son et al. |

FOREIGN PATENT DOCUMENTS

| | | |
|---|---|---|
| DE | 102008014672 B4 | 5/2013 |
| DE | 102016013404 A1 | 5/2018 |
| FR | 2952177 A1 | 5/2011 |
| GB | 2527770 A | 1/2016 |
| JP | H1063301 A | 3/1998 |
| JP | 3692106 B2 | 9/2005 |
| JP | 2017129583 A | 7/2017 |
| WO | WO2012122597 A1 | 9/2012 |
| WO | WO2013165346 A1 | 11/2013 |
| WO | WO2018094273 A1 | 5/2018 |

OTHER PUBLICATIONS

"Vibration Analysis: What Does It Mean?" Plant Services, Oct. 12, 2016, http://www.plantservices.com/assets/knowledge_centers/vibralign/assets/ra_vibration_analysis.pdf.

* cited by examiner

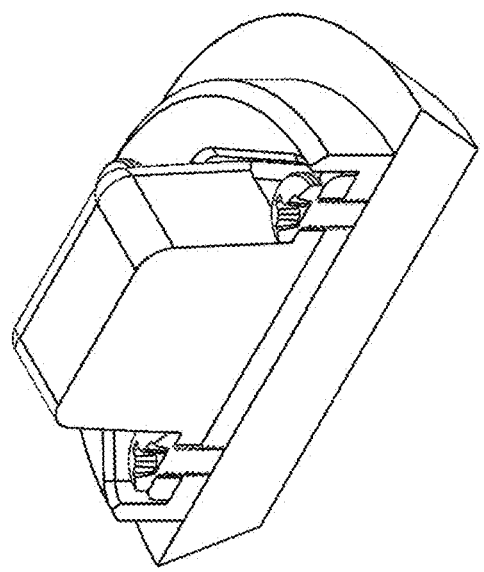
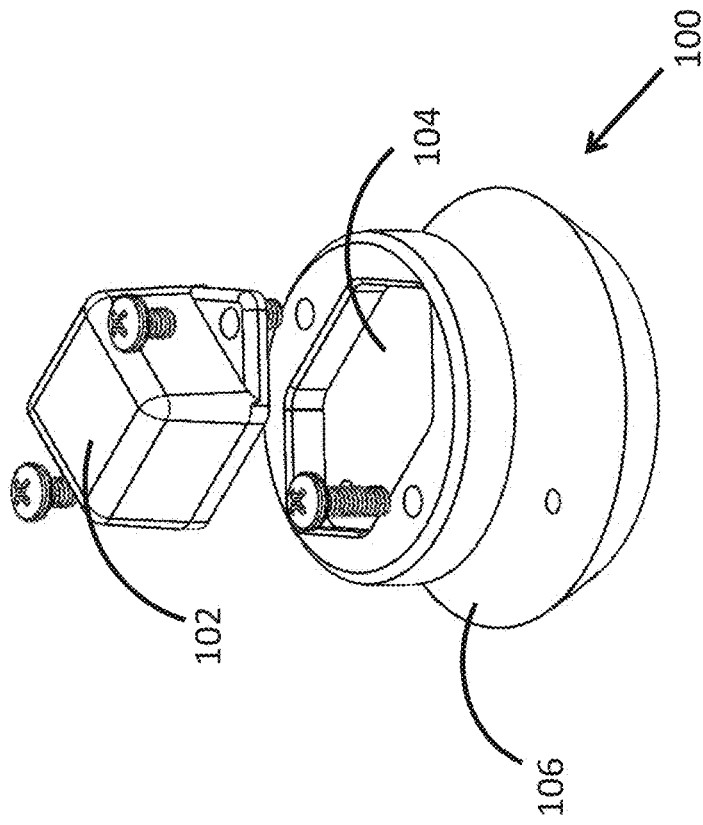
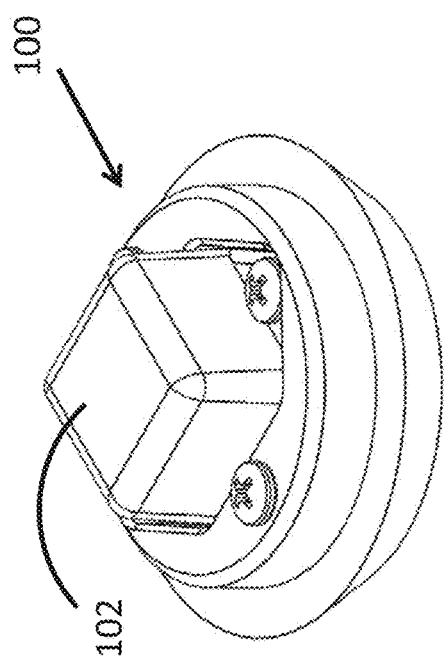
FIG. 2C
FIG. 2B
FIG. 2A

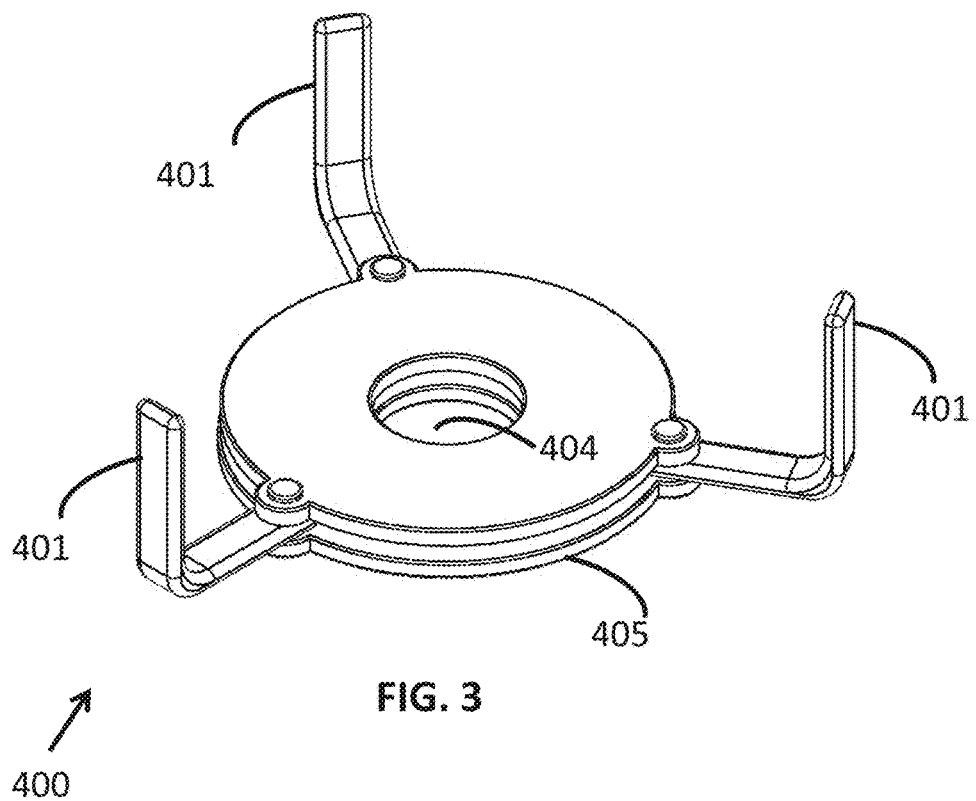
FIG. 3
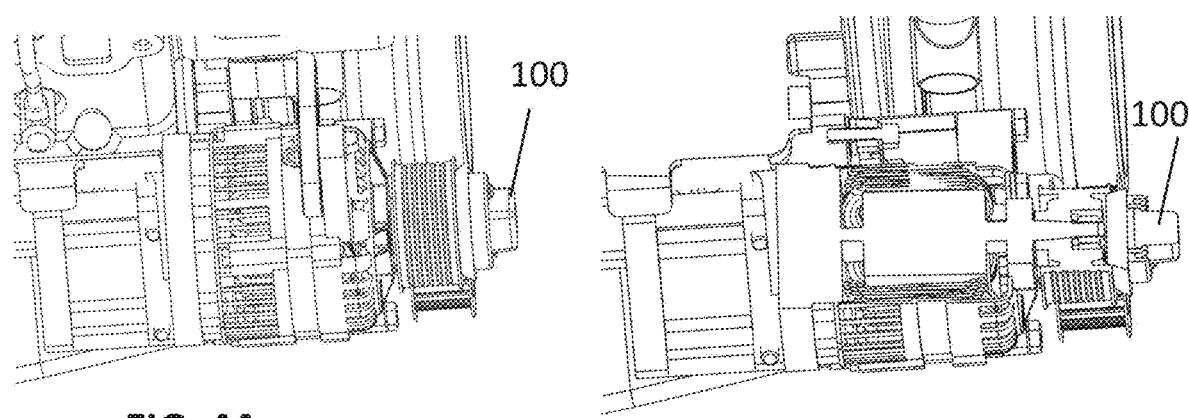
FIG. 4A
FIG. 4B

SYSTEMS AND METHODS FOR DETECTION AND ANALYSIS OF FAULTY COMPONENTS IN A ROTATING PULLEY SYSTEM

CROSS REFERENCE

This application is a continuation in part of PCT/US17/62403 filed on Nov. 17, 2017, which claims priority to U.S. Patent Application No. 62/423,479, filed Nov. 17, 2016, and claims priority to U.S. Provisional Patent Application No. 62/577,927, filed Oct. 27, 2017, the specifications of which are incorporated herein in their entirety by reference.

FIELD OF THE INVENTION

The present invention relates to rotating systems comprised of a plurality of rotating components which exhibit different mechanical characteristics when a component of the rotating system is faulty and, more specifically, where an analysis of these differing mechanical characteristics yields data on which component is faulty.

BACKGROUND OF THE INVENTION

Vibrations are but one example of parameters known as mechanical characteristics which define a material under force, pressure, or stress and strain of some kind. Other parameters include, but are not limited to, elastic or inelastic behavior, temperature, elongation, tensile strength, brittleness, bending, and an ability to conduct electricity in some measure. For the sake of clarity, this class of parameters will be herein represented using the term, vibrations. Rotating systems, or rotating components attached to stationary components, provide a particularly difficult case in which to identify a faulty component because of the rotation. Examples of such components in a rotating system in an automotive engine include, but are not limited to, an alternator and pulleys such as a crankshaft pulley, idler tension pulley, power steering pulley, water pump pulley, and compressor pulley. Complicating the fault identification even further is the presence of multiple sources of vibrations—such as within an automotive system—and those multiple sources make it more difficult to pinpoint the exact source of the defective vibration.

The technique of identifying faulty components in a rotating system by spotting excessive vibrations of a rotating component has long been appreciated by those skilled in the art of auto mechanics worldwide. A subtler variation of this technique has been to use instruments to detect vibrations not evident to most human perceptions. The vibration data recorded by those instruments is often processed and analyzed by applying known procedures in the art, such as Fourier analysis or a Fast Fourier Transform ("FFT"). Other techniques of detecting vibrations have been identified to determine mechanical characteristics in general and vibrations in particular, such as: piezoelectric crystals, a capacitance displacement probe, an inductance/eddy current displacement probe, an optical reflectance probe, or an accelerometer. The device used to measure vibrations is, for simplicity sake, hereafter referred to as a vibration detection device.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

As previously mentioned, the practice of acquiring and analyzing vibration data to detect faulty components in a rotating system is widely used in the automotive industry. However, no effective method of attaching a vibration detection device to a component of a rotating system such that unwanted vibrations are mitigated presently exists. Current vibration acquisition methods position the vibration detection device within the aperture of a rotating pulley with the first rotational axis of the vibration detection device and the second rotational axis of the pulley (to which the vibration detection device is attached) completely unaligned. This off-centered placement is apt to obviate the success of measurements taken because the vibration data measured is asymmetric to the pulley and likely subject to undesired forces that may distort the acquired rotational data.

The present invention uniquely resolves the aforementioned problems by providing a device attachable to the center of a component (i.e. a pulley or shaft) in a rotating system such that the rotational axis of the vibration detection device is parallel and aligned with the rotational axis of the component to which the device is attached. In this way, unwanted radial vibrations are effectively eliminated. None of the presently known works or references has this inventive feature of the present invention.

In some aspects, the present invention features a vibration monitoring system for identifying a faulty component in a rotating system. The rotating system may comprise one or more rotating components, each rotating component having a reference vibration signature. The vibration monitoring system may comprise a vibration detection unit comprising a vibration detection device comprising a motion sensor comprising a plurality of accelerometers, a processor unit operatively coupled to the motion sensor, a memory repository operatively coupled to the processor unit, and a wireless transmitter operatively coupled to the processor unit, where the vibration detection device is configured to detect and transmit a vibration emanating from each of the one or more rotating components; and a device base upon which the vibration detection device is disposed. The system may further include a wireless receiving unit having a user interface.

In one aspect, the vibration detection unit may be disposed on a component of the one or more rotating components such that a rotational axis of the vibration detection unit is parallel and aligned with a rotational axis of the component to which the vibration detection unit is attached. When the component rotates, the vibration detection device can detect vibrations emanating from each component and collects each detected vibration into a set of vibrations.

In some aspects, the motion sensor can acquire a set of measurements of the vibrations and transmits said measurements to the processor unit. The memory repository stores a set of computer-executable functions that, when executed by the processor unit, causes the processor unit to perform operations comprising performing an analysis of the measurements that compares the vibrations to the reference vibration signature and calculates deviations to determines whether the rotating component is faulty; storing the measurements and results of the analysis in the memory repository; and transmitting the measurements or said results to the wireless receiving unit.

In further aspects, the wireless receiving unit is configured to acquire and transmit the measurements or the results to an analyzer. The analyzer is configured to perform another analysis of the measurements to determine whether the rotating component is faulty. The results may then be displayed on the user interface.

Definitions

As used herein, the term "wireless" refers to an electromagnetic means of propagating a signal. Examples of wireless devices or systems include Bluetooth devices and radio.

As used herein, the term "rotational axis" (or "axis of rotation") refers to a fixed line passing through a moving body about which the moving body rotates.

As used herein, the term "analyzer" or "analyzing unit" refers to the process of analyzing the mechanical characteristics of a rotating component(s) and yielding decision data as to whether and which rotating component of a rotating system is faulty (or not) and may be implemented on any device capable of said process (e.g., a cell phone application).

BRIEF DESCRIPTION OF THE DRAWINGS

The features and advantages of the present invention will become apparent from a consideration of the following detailed description presented in connection with the accompanying drawings in which:

FIG. 2A is a view of an embodiment of the vibration detection unit, wherein the vibration detection unit comprises a vibration detection device, a base magnet and a device base.

FIG. 2B shows an exploded view of the vibration detection unit of FIG. 2A.

FIG. 2C shows a cross-sectional view of the vibration detection unit of FIG. 2A.

FIG. 3 shows the retractable-hinged alignment aide used for a non-magnetic embodiment of the vibration detection unit.

FIG. 4A shows the vibration detection unit operatively connected to a rotating system of an automotive engine.

FIG. 4B shows a cross-sectional view of the vibration detection unit operatively connected to a rotating system.

DETAILED DESCRIPTION OF THE INVENTION

Figure 1B:
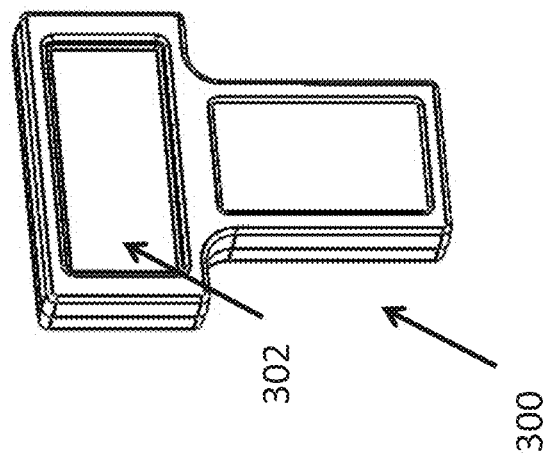
FIG. 1B shows a wireless receiving unit having a user interface disposed thereon.
Figure 1A:
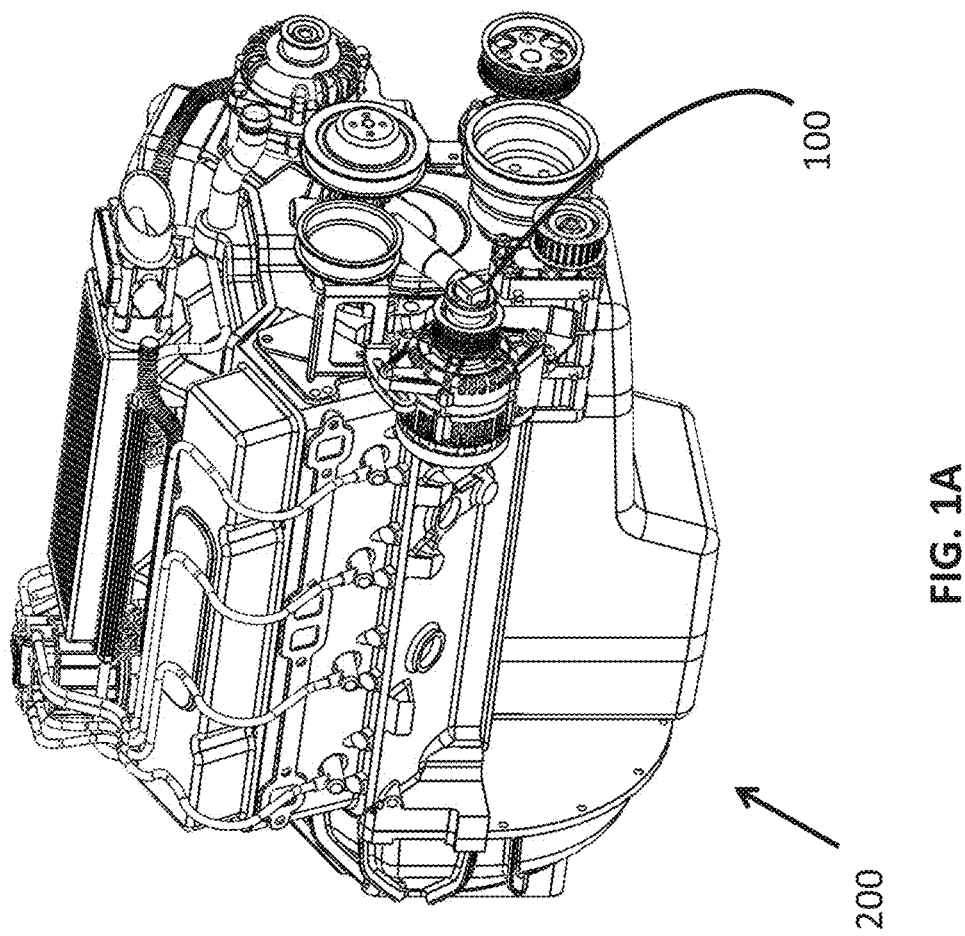
FIG. 1A is a depiction of a vibration detection unit of the present invention disposed within a rotating system of an automotive engine.

Referring now to FIGS. 1A-12, the present invention features a vibration monitoring system for identifying a faulty component in a rotating system, where the rotating system may comprise one or more rotating components. The rotating system may be, for example, one of the plurality of rotating systems comprising an automotive engine. Each of the one or more rotating components has a reference vibration signature modeling a normal vibration emanating from said component. In one embodiment, the vibration monitoring system comprises a vibration detection unit (100) having a vibration detection device (102) and a device base (104) upon which the vibration detection device (102) is disposed. The vibration detection device (102) disclosed herein may be any instrument configured to detect and transmit the vibration emanating from each of the aforementioned rotating components. Further, the one or more rotating components may be attached either directly or indirectly (e.g., via a pulley connection) to the vibration detection unit (100).

In some embodiments, the vibration detection device (102) is a motion sensor comprising one or more accelerometers, a processor unit operatively coupled to the motion sensor, a memory repository operatively coupled to the processor unit, and a wireless transmitter operatively coupled to the processor unit. In another exemplary embodiment, the motion sensor comprises n accelerometers, each 360/n degrees out of phase, collecting motion data at a very high rate (e.g., about 10 kHz). In another embodiment, the memory repository is a Random Access Memory data storage device. In additional embodiments, the processor unit comprises a temporary storage unit, operatively coupled to the motion sensor and the memory repository, and a primary data analyzer, operatively coupled to the wireless transmitter and the memory repository. In other embodiments, the vibration detection device (102) may be powered by a battery.

The system may further comprise a wireless receiving and analysis unit (300) having a user interface (302). In the present embodiment, the vibration detection unit (100) is disposed at the center of a component, of the one or more rotating components, such that the rotational axis of the vibration detection unit (100) is parallel and aligned with the rotational axis of the component to which the vibration detection unit (100) is attached. In some embodiments, as the component rotates, the vibration detection device (102) detects the vibration emanating from each component and collects each detected vibration into a set of vibrations. In other embodiments, the vibration detection device (102) then sends the set of vibrations as a signal to the wireless receiving and analysis unit (300). Examples of the wireless receiving and analysis unit (300) include, but are not limited to, a mobile device, for example, a mobile phone or tablet, or a laptop or a computer etc.

In further embodiments, the processor or the wireless receiving and analysis unit processes and analyzes the signal and determines, based on comparing each vibration in the set of vibrations with the vibration signature of the corresponding component, which component is faulty. In an embodiment, a deviation from the vibration signature is determined and analyzed (i.e., to determine if a component is faulty) via machine learning algorithms such as neural networks and support vector machines. The wireless receiving and analysis (300) unit may then display, via the user interface (302), decision data comprising which component in the rotating system is faulty.

In one embodiment, the processor or the wireless receiving and analysis unit performs a frequency-based analysis, such as Fourier Analysis or a FFT, to analyze the measurements. Alternatively, time-based and/or training and learning methodologies may also be performed to analyze the measurements. For instance, the wireless receiving and analysis unit can perform an analysis to compute an FFT, with the analysis further comprising the use of any machine learning algorithms (e.g. support vector machines) to support in determining the deviation of the vibration (identifying the faulty rotary component) from the vibration signature of the rotating component.

In some embodiments of the system, the device base (104) is disposed on a base magnet (106) for magnetic attachment of the vibration detection unit (100) to a steel portion of a component in the rotating system. In this embodiment, the component upon which the vibration detection device (100) is disposed is a pulley. The vibration detection unit (100) is disposed within the center of the pulley such that the rotational axis of the vibration detection unit (100) is parallel and aligned with the rotational axis of the pulley. In this arrangement, the presence of undesired forces in the acquired data is effectively eliminated. As a non-limiting example, the base magnet (106) may be orientated axially with respect to the rotational axis of the rotating component. In one embodiment, the device base may comprise a plurality of magnets oriented radially about the base. In some embodiments, the magnets may contact the rotating component. In other embodiments, the magnets may not directly contact the rotating component, but rather provide a sufficient pull force to hold the device base to the rotating component. In still other embodiments, the device base may comprise a combination of a radially oriented and axially oriented magnets. In one embodiment the base magnet may be a hexagonal magnet. In other embodiments, the base magnet may have a shape other than a hexagonal shape. As non-limiting examples, the base magnet may be a circular, triangular, square, heptagonal, octagonal, polygonal, ring-shaped, rod-shaped, horseshoe-shaped, bar-shaped, or irregularly shaped magnet. In another embodiment, the device base (710) itself may be magnetic.

Figure 5C:
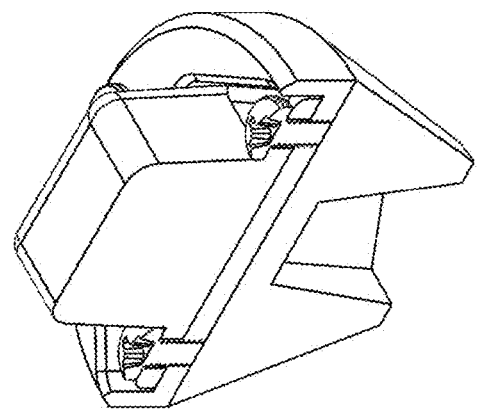
FIG. 5C is a cross-sectional view of the vibration detection unit shown in FIG. 5A, where a hexagonal cut-out is built into a posterior end of the base magnet to allow for best surface contact on a central shaft nut.
Figure 5B:
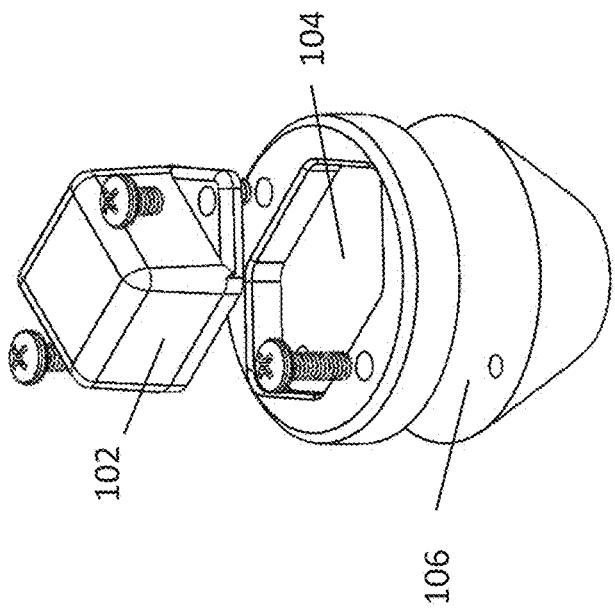
FIG. 5B is an exploded view of the vibration detection unit shown in FIG. 5A. The detection unit can mate with the device base via hexagonal cut-out disposed on a distal end of the device base.
Figure 5A:
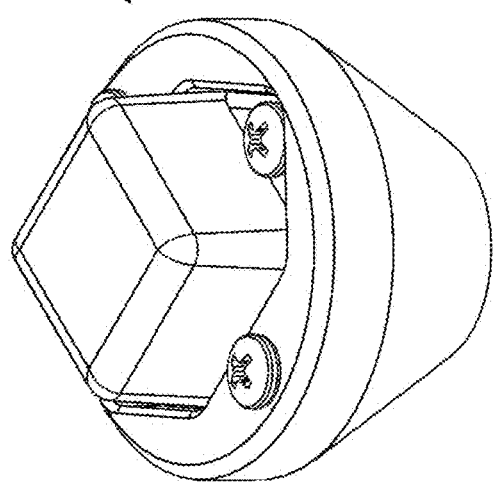
FIG. 5A is an alternate embodiment of the vibration detection unit.
Figure 5D:
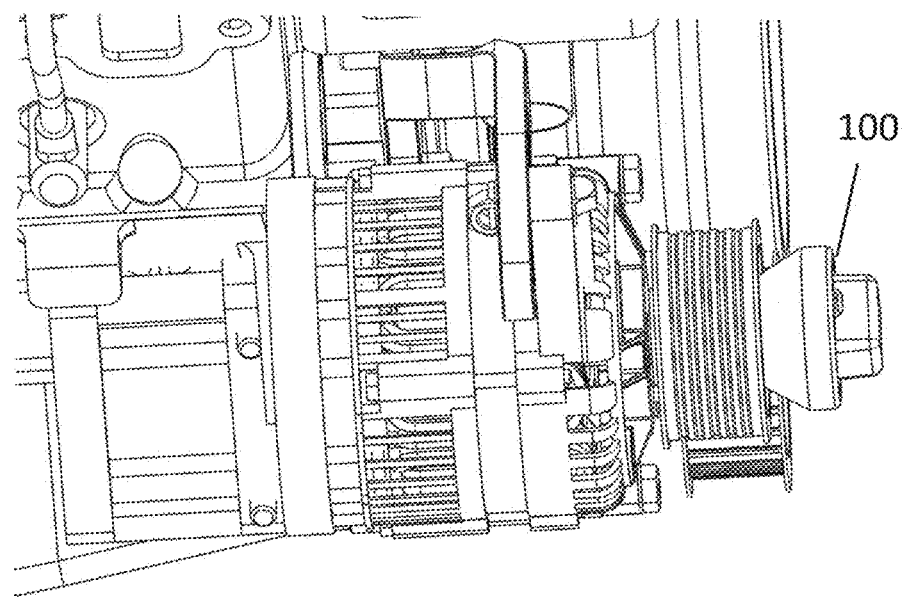
FIG. 5D shows the vibration detection unit shown in FIG. 5A placed inside a rotating pulley system of an automotive engine.
Figure 5E:
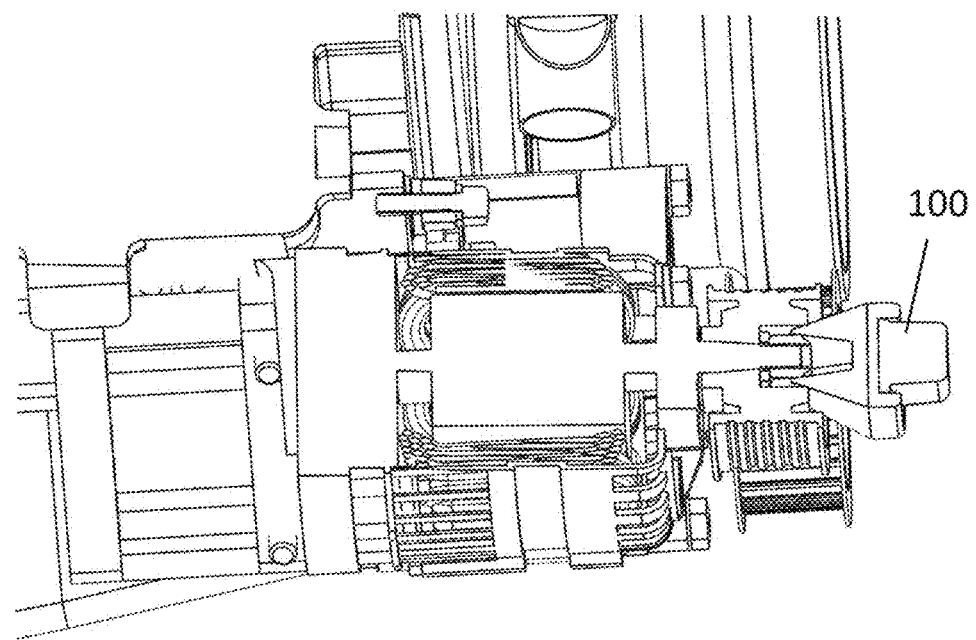
FIG. 5E shows a cross-sectional view of the vibration detection unit shown in FIG. 5A inside a rotating pulley system of an automotive engine.
Figure 6C:
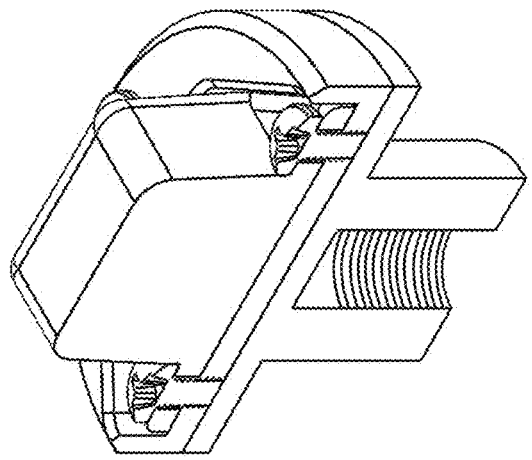
FIG. 6C shows a cross-sectional view of the vibration detection unit shown in FIG. 6A, where the base the base magnet has female threads, which allows a user to remove an existing nut on a central pulley shaft and replace it with the vibration detection unit.
Figure 6B:
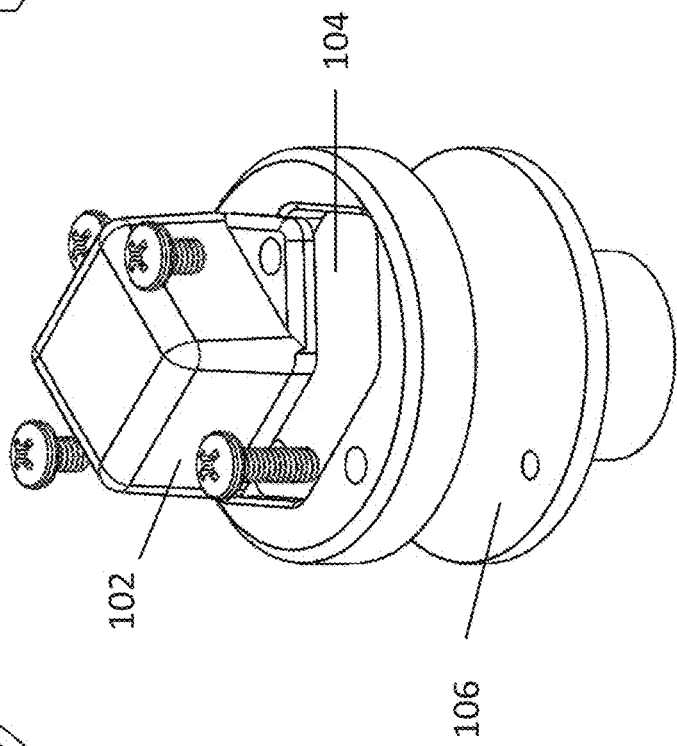
FIG. 6B shows an exploded view of the vibration detection unit shown in FIG. 6A.
Figure 6A:
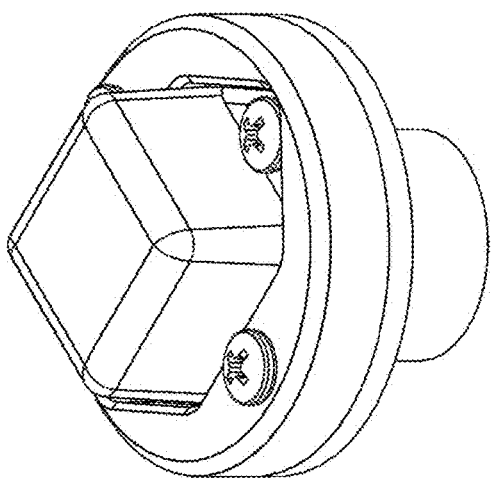
FIG. 6A shows another alternate embodiment of the vibration detection unit.
Figure 6D:
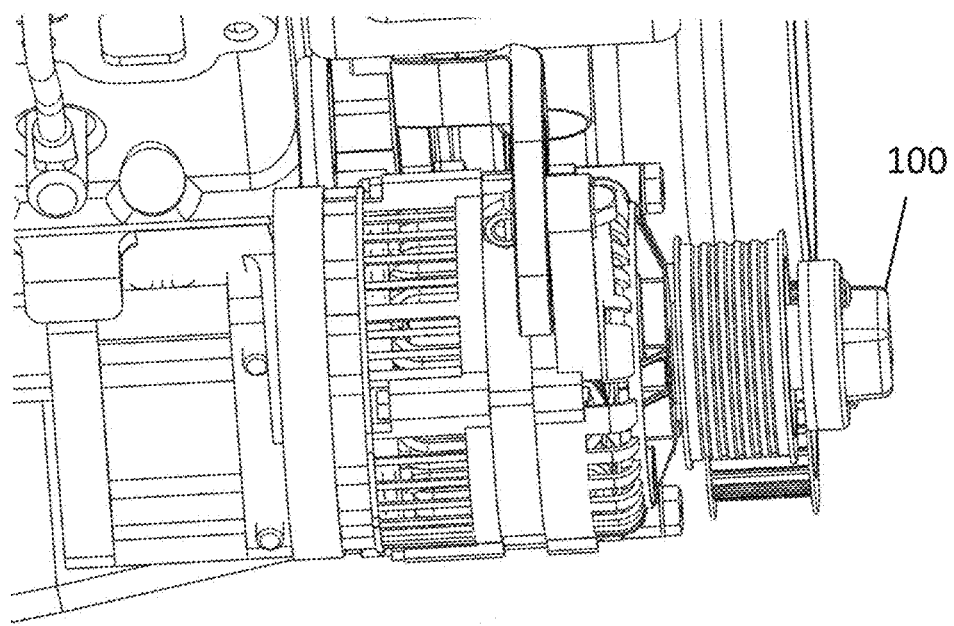
FIG. 6D shows the vibration detection unit shown in FIG. 6A placed inside a rotating pulley system of an automotive engine.
Figure 6E:
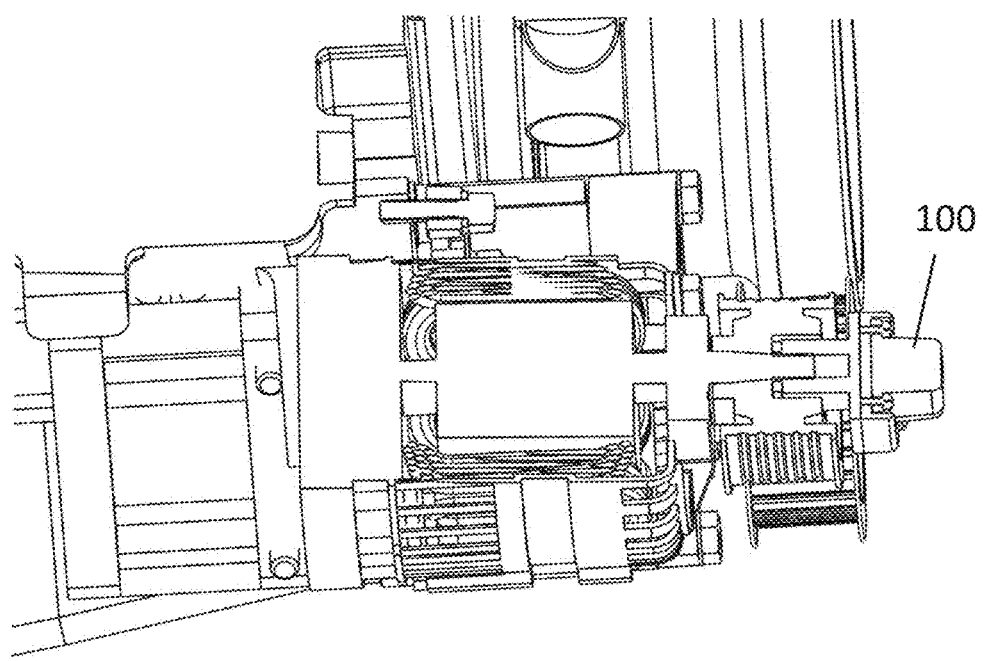
FIG. 6E shows a cross-sectional view of the vibration detection unit shown in FIG. 6A threaded onto a central pulley shaft of an automotive engine.
Figure 7C:
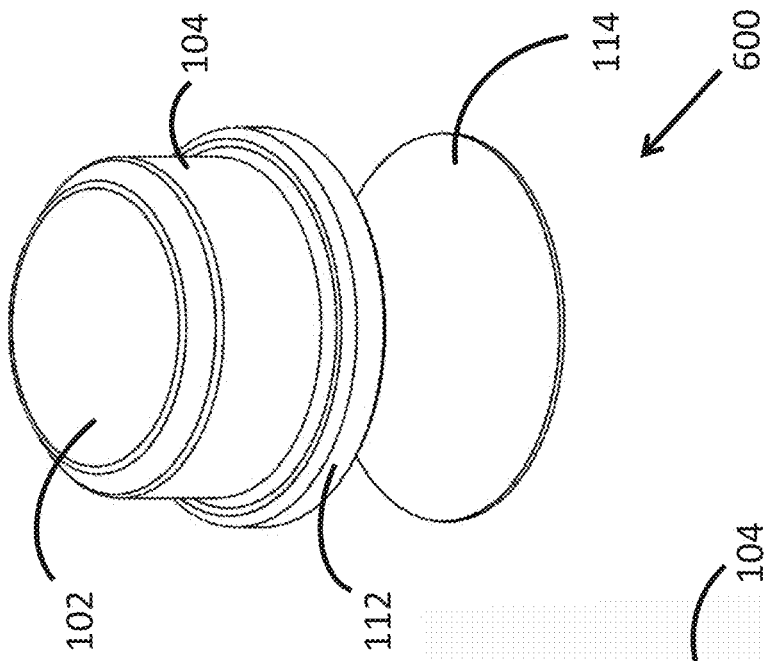
FIG. 7C shows an exploded view of the vibration detection unit in FIG. 7A. The vibration detection unit, with a permanently affixed loop pad, is shown separated from the hook pad that would be placed on a shaft of the rotating system.
Figure 7B:
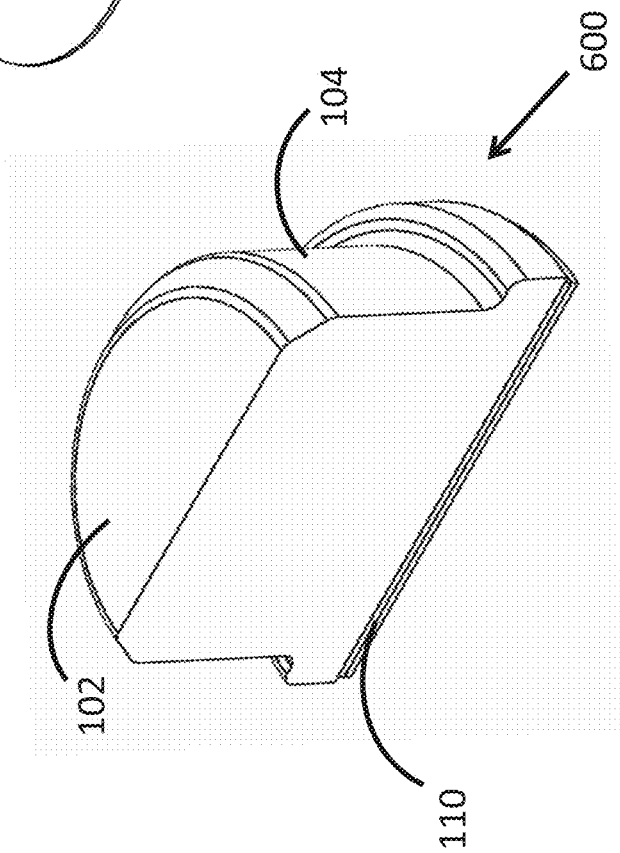
FIG. 7B shows a cross-sectional view of the vibration detection device in FIG. 7A. Hook and loop material can be seen on the lower portion of the vibration detection unit. The loop pad is permanently adhered to the bottom of the vibration detection unit. The hook pad has adhesive on one end and may be affixed to a shaft in the rotating system with the help of the alignment aide.
Figure 7A:
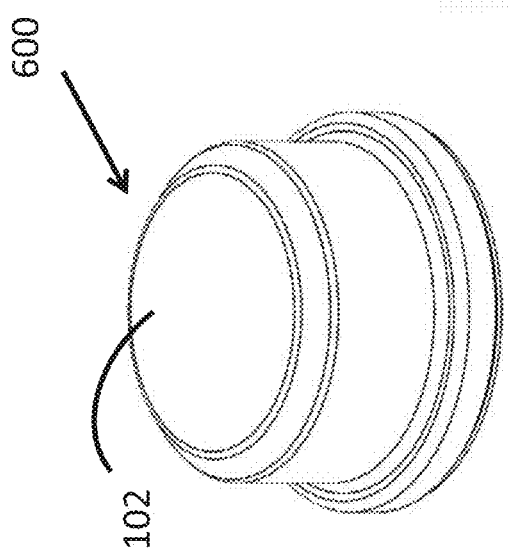
FIG. 7A shows a vibration detection device utilizing a hook and loop means for a non-magnetic attachment to a component in a rotating system.
Figure 7D:
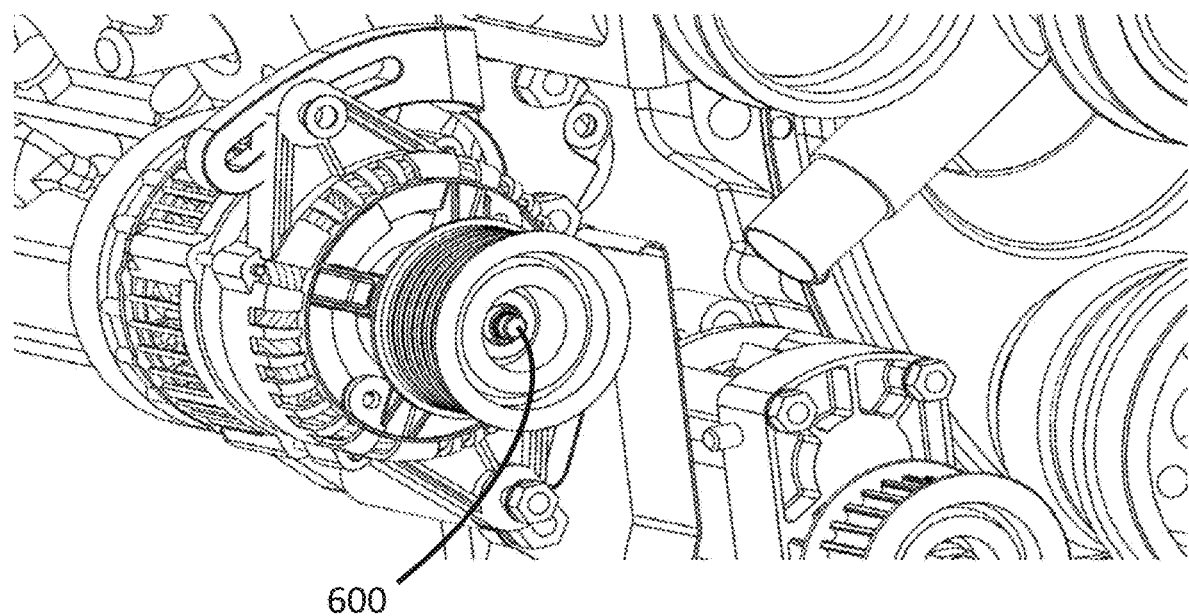
FIG. 7D shows the vibration detection unit of FIG. 7A affixed to the shaft of a rotating system in an automotive engine.
Figure 7E:
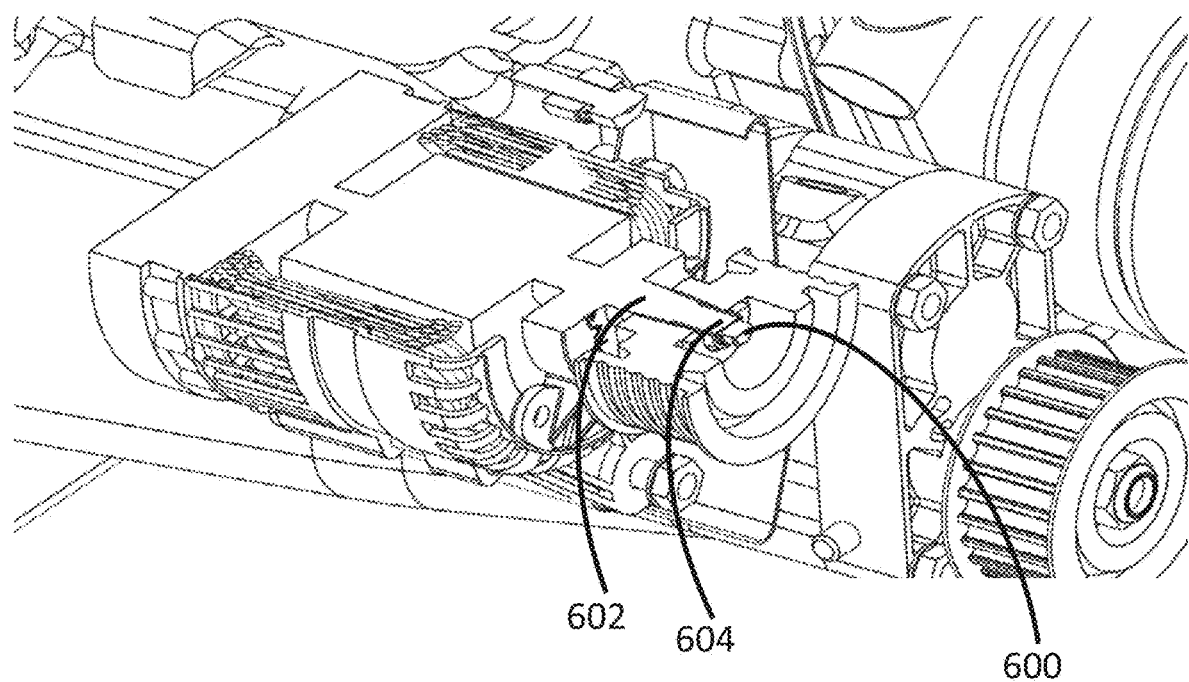
FIG. 7E shows a cross-sectional view of the vibration detection unit of FIG. 7A affixed to the shaft of a rotating system in an automotive engine.
Figure 8A:
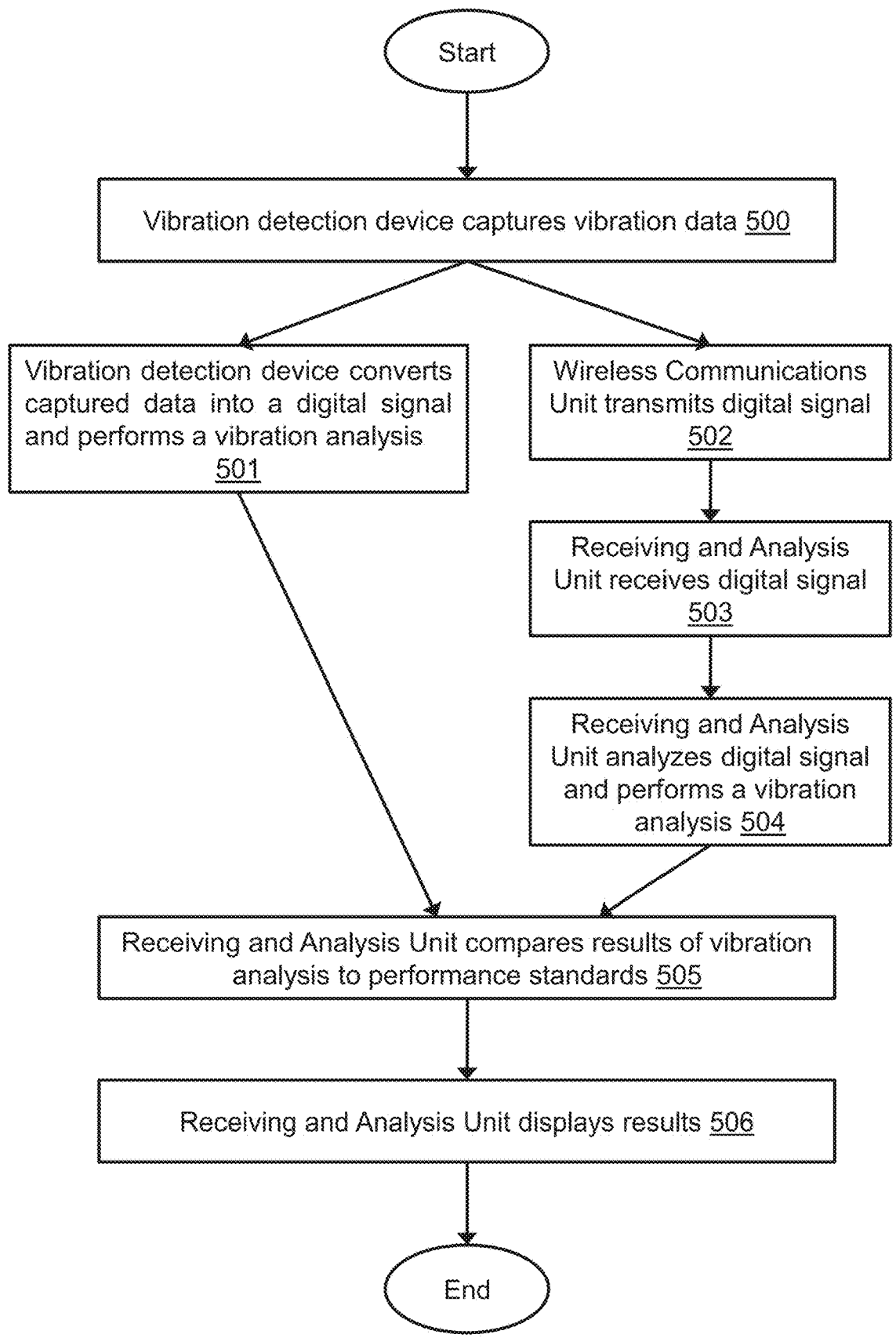
FIG. 8A shows a flow chart of a method for detecting and analyzing vibration in accordance with the present invention.
Figure 8B:
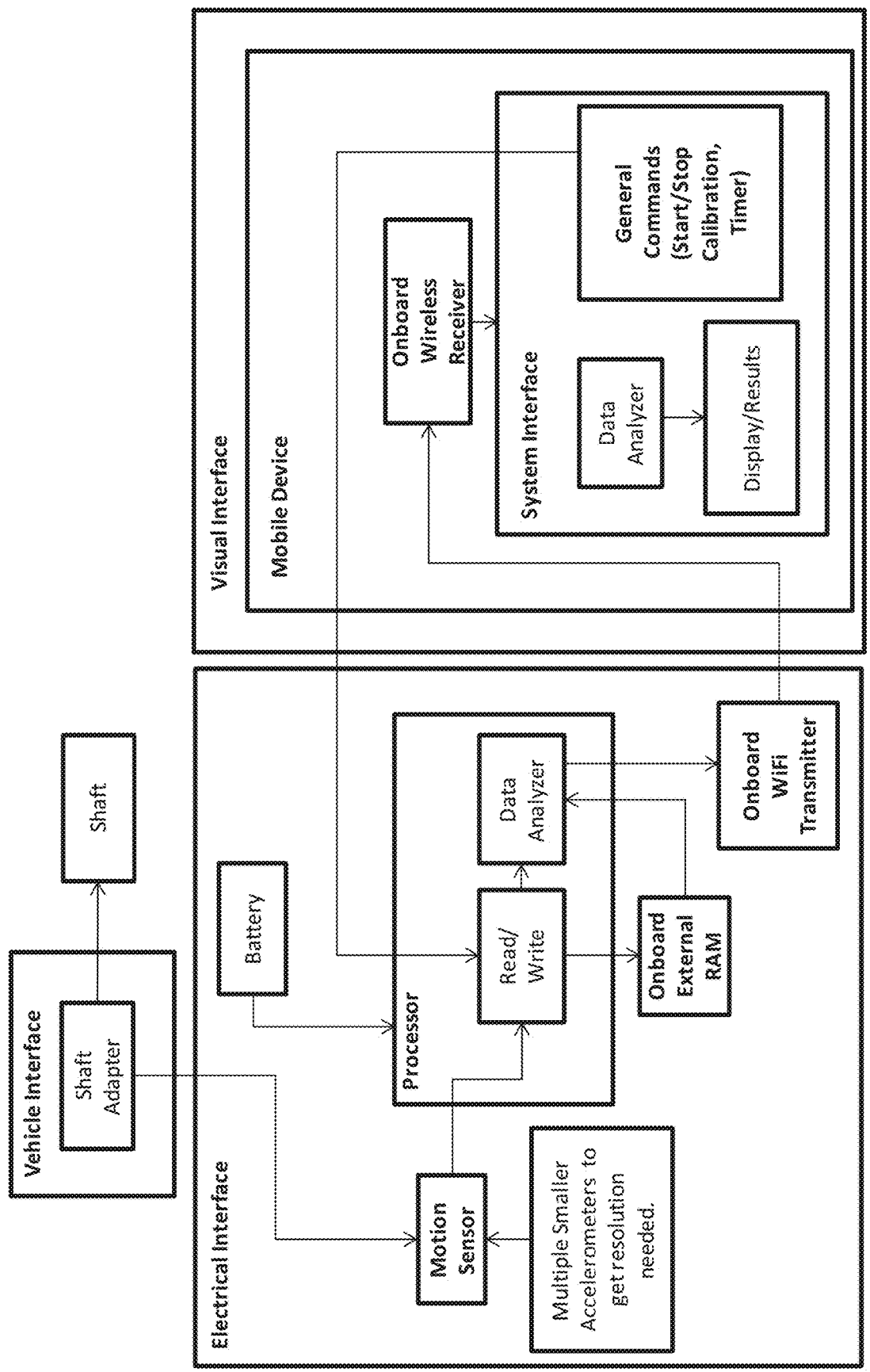
FIG. 8B shows a schematic of the vibration monitoring system.
Figure 9:
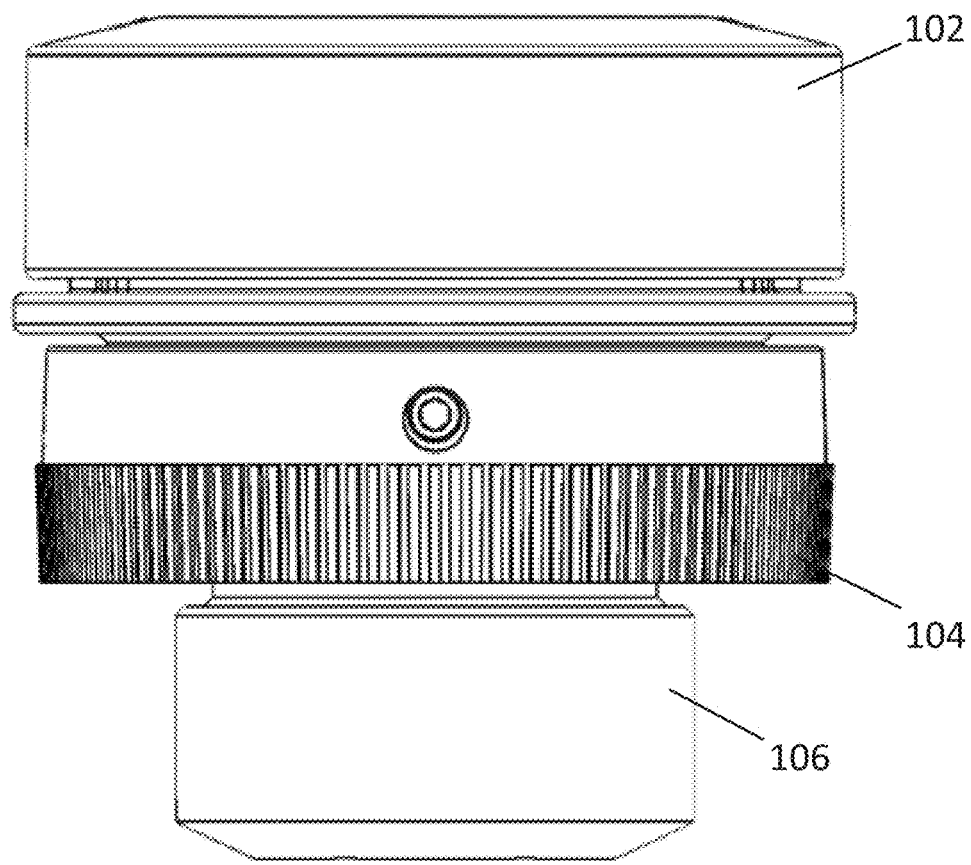
FIG. 9 shows another alternate embodiment of the vibration detection unit.
Figure 10:
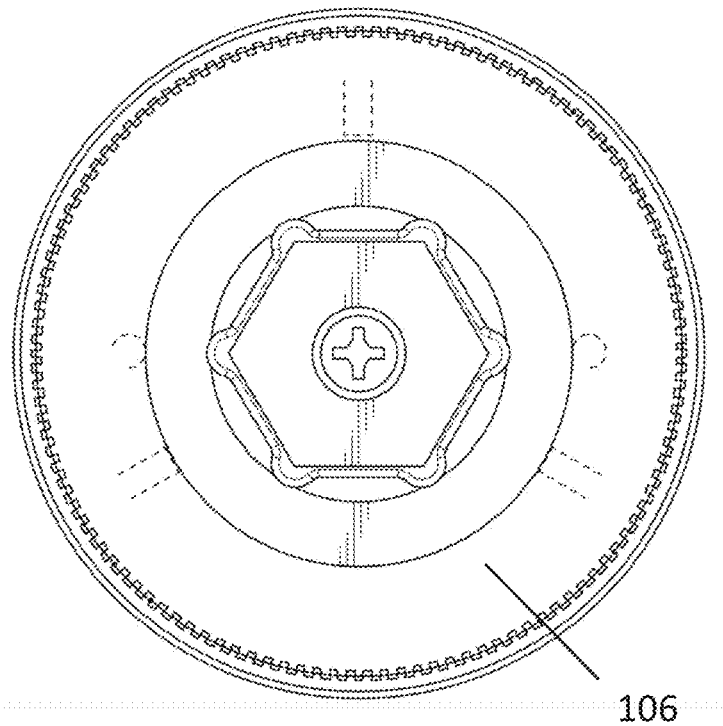
FIG. 10 shows a bottom view of the vibration monitoring system in FIG. 9, which clearly depicts the hexagonal cut-out disposed on the posterior end of the base magnet.
Figure 12:
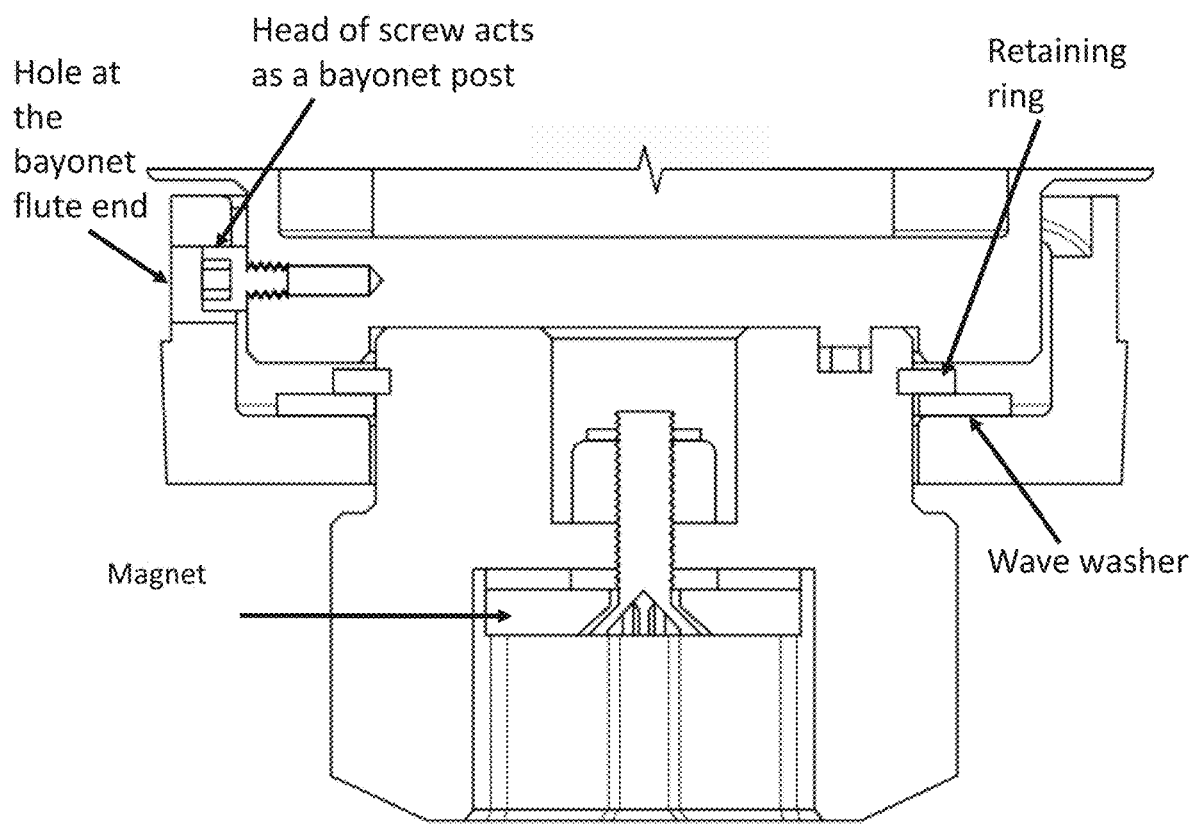
FIG. 12 shows a cross-sectional view of FIG. 11 highlighting the bayonet mechanism.

A hexagonal shape may be built into the base magnet (106) to allow for best surface contact on a central shaft nut (FIGS. 5A-5C). This method of attachment is critical because the shape of the base magnet (106) can help center the vibration detection unit (100). Without wishing to limit the invention to a particular theory or mechanism, this centering of the vibration detection unit (100) is what leads to the elimination of sensing unwanted vibrations. Referring to FIGS. 6A to 6E, in another embodiment of the present system, the device base (104) is a threaded nut allowing a user to remove the existing nut on a central pulley shaft and replace it with the vibration detection unit (100). As a non-limiting example, a non-magnetic shaft/nut receptacle may have a hexagonal cut-out as shown in FIG. 12. At the center of that shaft/nut receptacle may be a thru hole. A hexagonal base magnet (106) with a countersunk hole may be placed in the hexagonal cut-out. A screw may be passed through the hole and constrain the base magnet (106) into its appropriate position. In this embodiment, the base magnet (106) comprises a non-magnetic shell and a magnetic component being an additional piece inserted into the non-magnetic shell. In alternative embodiments, the shell of the base magnet (106) may comprise a partially magnetic-material, such as aluminum. In alternative embodiments, the entire base magnet (106) is comprised of a magnetic material.

Figure 11:
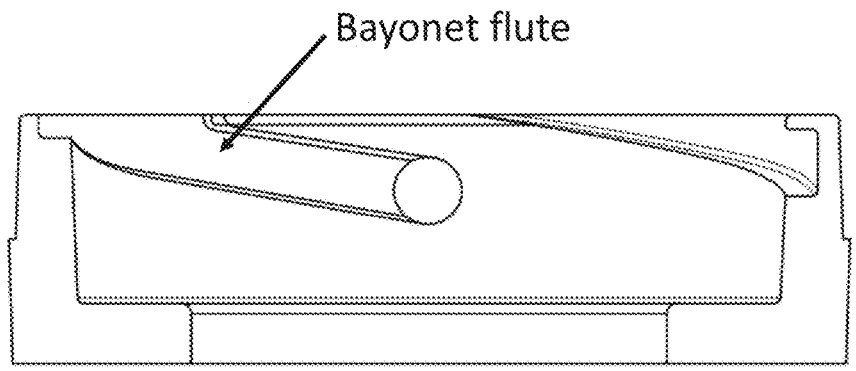
FIG. 11 shows a close-up view of an embodiment where the vibration sensing unit is constrained to the base magnet by a bayonet latch mechanism.

Aside from being attached via screws, in other embodiments, the vibration detection unit (100) may be constrained to the base magnet (106) by a bayonet latch mechanism coupled with a wave washer and retaining ring as shown in FIGS. 11-12. The bayonet latch mechanism may comprise bayonet flutes in which bayonet posts are inserted. However, the vibration detection unit (100) may be attached to the device base (104) by any appropriate and sufficient means.

An alignment aide (400) may be utilized in another embodiment of the present invention to position the vibration detection unit (600) on a component in the rotating system. In this embodiment, the vibration detection unit (600) further comprises a hook and loop pad (110) (e.g., Velcro) disposed on the device base (104) for a nonmagnetic attachment of the vibration detection unit (600) to the component. The loop pad (112) may be permanently fixed to the bottom of the vibration detection unit (600) and the hook pad (114) may affix permanently to the component of the rotating system. In this way, the vibration detection unit (600) may be placed for monitoring vibrations and subsequently removed from the component when measurements have been taken. The component upon which the vibration detection unit (600) is disposed may be a solid cylindrical shaft (602) having at least one accessible end (604). The aforementioned alignment aide (400) may be used to position the vibration detection unit (600) onto a center of the accessible end (604) of the shaft (602) such that the vibration detection unit (600) and the shaft (602) share a common axis of rotation.

Further, the alignment aide (400) may be comprised of a ring (405) having a center aperture (404), and a plurality of hinged spring-loaded arms (401). These spring-loaded arms may be disposed equidistantly on the ring (405) and may be expandable and retractable concentrically (e.g., to reflect the circumference of the vibration detection unit (600)). The center aperture (404) may allow for marking the center of the accessible end (604) of the shaft (602). To attach the vibration detection unit (600) to the center of the accessible end (604) of the shaft (602), via the hook and loop pad (110), the hinged spring-loaded arms may be adjusted to contact the circumference of the vibration detection unit (600). The center aperture (404) may then be used to align the vibration detection unit (600) with the center of the accessible end (604) of the shaft (602), which may then be affixed to the accessible end (604) of the shaft (602) by the hook and loop pad (110).

In another embodiment, the vibration emanating from each of the one or more rotating components comprising the rotating system may comprise one or more of the following: a physical vibration, elastic or inelastic behavior, temperature, elongation, tensile strength, brittleness, bending or electrical conductivity.

A further embodiment of the system features at least two components of the rotating system each having a vibration detection unit (100) disposed therein or a vibration detection unit (600) disposed thereon. The wireless receiving and analysis unit analyzes an aggregate set of vibrations for the detection of one or more faulty components.

Consistent with previous embodiments, the wireless receiving and analysis (300) unit or sensor processor may analyze the set of vibration data received from the vibration detection unit (100 or 600). Examples of analyzation techniques may include, but are not limited to: spectral analysis (e.g., Fourier Analysis or FFT) or time-based analysis. Processing the data in this way allows the analysis to be conducted in the frequency spectrum, where vibrations not evident to most human perceptions may be detected and evaluated against the vibration signature of the rotating component.

In additional embodiments, the vibration detection unit (100) further comprises a detection analysis unit. In one embodiment, the detection analysis unit performs an analysis of the set of vibrations. Results from the analysis may be transmitted to the wireless receiving and analysis unit (300), which may then perform a secondary analysis of said results. In an alternate embodiment, the detection analysis unit analyzes the set of vibrations to determine, based on comparing each vibration in the set of vibrations with the vibration signature of the corresponding component, which component is faulty.

The present invention further comprises a method for identifying a faulty component in a rotating system. The rotating system may comprise one or more rotating components, each component having a reference vibration signature. In some embodiments, the method comprises providing any of the vibration monitoring system as described herein. For example, the vibration monitoring system may comprise a vibration detection unit (100) and a wireless receiving and analysis unit (300) having a user interface (302). In further embodiments, the vibration detection unit (100) comprises a vibration detection device (102) configured to detect and transmit a vibration emanating from each of the one or more rotating components; and a device base (104) upon which the vibration detection device (102) is disposed.

In some embodiments, the method further comprises attaching the vibration detection unit (100) to a center of a component of the one or more rotating components such that a rotational axis of the vibration detection unit (100) is parallel and aligned with a rotational axis of the component to which the vibration detection unit (100) is attached, wherein as the component rotates, the vibration detection device (102) detects the vibration emanating from each component and collects each detected vibration into a set of vibrations and sends the set of vibrations as a signal to the wireless receiving and analysis unit (300); processing and analyzing the signal, via the wireless receiving and analysis unit (300), wherein said processing and analysis determines, based on comparing each vibration in the set of vibrations with the vibration signature of the corresponding component, which component is faulty; and displaying, via the user interface (302), decision data comprising which component in the rotating system is faulty.

In supplementary embodiments, the device base (104) is disposed on a base magnet (106) for magnetic attachment of the vibration detection unit (100) to a steel portion of a component in the rotating system. In this embodiment, the component upon which the vibration detection device (100) is disposed is a pulley. The vibration detection unit (100) is disposed within the center of the pulley such that the rotational axis of the vibration detection unit (100) is parallel and aligned with the rotational axis of the pulley. In this arrangement, the presence of undesired forces in the acquired data is effectively eliminated. Further, a hexagonal shape may be built into the base magnet (106) to allow for best surface contact on a central shaft nut. This method of attachment is highly significant to the present embodiment because the shape of the base magnet (106) will help center the vibration detection unit (100), this centering of the vibration detection unit (100) is what leads to the elimination of unwanted vibrations.

Referring to FIGS. 6A-6E, in another embodiment, the device base (104) is a threaded nut allowing a user to remove the existing nut on a central pulley shaft and replace it with the vibration detection unit (100). In another embodiment, a non-magnetic shaft/nut receptacle may have a hexagonal cut-out as depicted in FIG. 12. At the center of that shaft/nut receptacle may be a thru hole. In another embodiment, the hole that the screw goes through to mount the magnet may not be a thru hole that is meant to clear the screw (so that a nut is needed to react to the torque that is applied to the screw). As non-limiting examples, the hole could be a threaded blind or a threaded thru hole to fasten the screw down to the adaptor. A hexagonal magnet with a countersunk hole may be placed in the hexagonal cut-out. A screw may be passed through the hole and constrain the magnet into its appropriate position. In other embodiments, the magnet may be fastened to the adaptor by means other than a screw. As a non-limiting example, the magnet may be fastened to the adapter by an adhesive compound. The base magnet has a non-magnetic shell and the magnetic component is an additional piece inserted into the non-magnetic shell. In alternative embodiments, the shell of the base magnet (106) may comprise a partially magnetic-material, such as aluminum. In alternative embodiments, the entire base magnet (106) is comprised of a magnetic material.

In some embodiments, the vibration detection unit (100) is constrained to the base magnet (106) by a bayonet latch mechanism coupled with a wave washer and retaining ring as shown in FIGS. 11-12. Again, the vibration detection unit (100) may be attached to the device base (104) by any appropriate and sufficient means, and is not limited to the bayonet latch or screw mechanism.

An alignment aide (400) may be utilized in another embodiment of the present invention to position the vibration detection unit (600) on a component in the rotating system. In this embodiment, the vibration detection unit (600) further comprises a hook and loop pad (110) (e.g., Velcro) disposed on the device base (104) for a nonmagnetic attachment of the vibration detection unit (600) to the component. The loop pad (112) may be permanently fixed to the bottom of the vibration detection unit (600) and the hook pad (114) may affix permanently to the component of the rotating system. In this way, the vibration detection unit (600) may be placed for monitoring vibrations and subsequently removed from the component when measurements have been taken. The component upon which the vibration detection unit (600) is disposed may be a solid cylindrical shaft (602) having at least one accessible end (604). The aforementioned alignment aide (400) may be used to position the vibration detection unit (600) onto a center of the accessible end (604) of the shaft (602) such that the vibration detection unit (600) and the shaft (602) share a common axis of rotation.

Further, the alignment aide (400) may be comprised of a ring (405) having a center aperture (404), and a plurality of hinged spring-loaded arms (401). These spring-loaded arms may be disposed equidistantly on the ring (405) and may be expandable and retractable concentrically (e.g., to reflect the circumference of the vibration detection unit (600)). The center aperture (404) may allow for marking the center of the accessible end (604) of the shaft (602). To attach the vibration detection unit (600) to the center of the accessible end (604) of the shaft (602), via the hook and loop pad (110), the hinged spring-loaded arms may be adjusted to contact the circumference of the vibration detection unit (600). The center aperture (404) may then be used to align the vibration detection unit (600) with the center of the accessible end (604) of the shaft (602), which may then be affixed to the accessible end (604) of the shaft (602) by the hook and loop pad (110).

In another embodiment, the vibration emanating from each of the one or more rotating components comprising the rotating system may comprise one or more of the following: a physical vibration, elastic or inelastic behavior, temperature, elongation, tensile strength, brittleness, bending or electrical conductivity.

A further embodiment features at least two components of the rotating system each having a vibration detection unit (100) disposed therein or a vibration detection unit (600) disposed thereon. Each sensor processor or the wireless receiving and analysis unit can analyze an aggregate set of vibrations for the detection of one or more faulty components.

Consistent with previous embodiments, the wireless receiving and analysis (300) unit or sensor processor may analyze the set of vibration data received from the vibration detection unit (100 or 600). In some embodiments, a deviation from the vibration signature is determined and analyzed (i.e., to determine if a component is faulty) via machine learning algorithms such as neural networks and support vector machines. Examples of analysis techniques may include, but are not limited to: spectral analysis (e.g., Fourier Analysis or FFT) or time-based analysis. Processing the data in this way allows the analysis to be conducted in the frequency spectrum, where vibrations not evident to most human perceptions may be detected and evaluated against the vibration signature of the rotating component.

In additional embodiments, the vibration detection unit (100) further comprises a detection analysis unit. In one embodiment, the detection analysis unit performs a primary analysis of the set of vibrations. Results from the primary analysis may be transmitted to the wireless receiving and analysis unit (300), which may then perform a secondary analysis of said results. In an alternate embodiment, the detection analysis unit analyzes the set of vibrations to determine, based on comparing each vibration in the set of vibrations with the vibration signature of the corresponding component, which component is faulty.

Figure 13A:
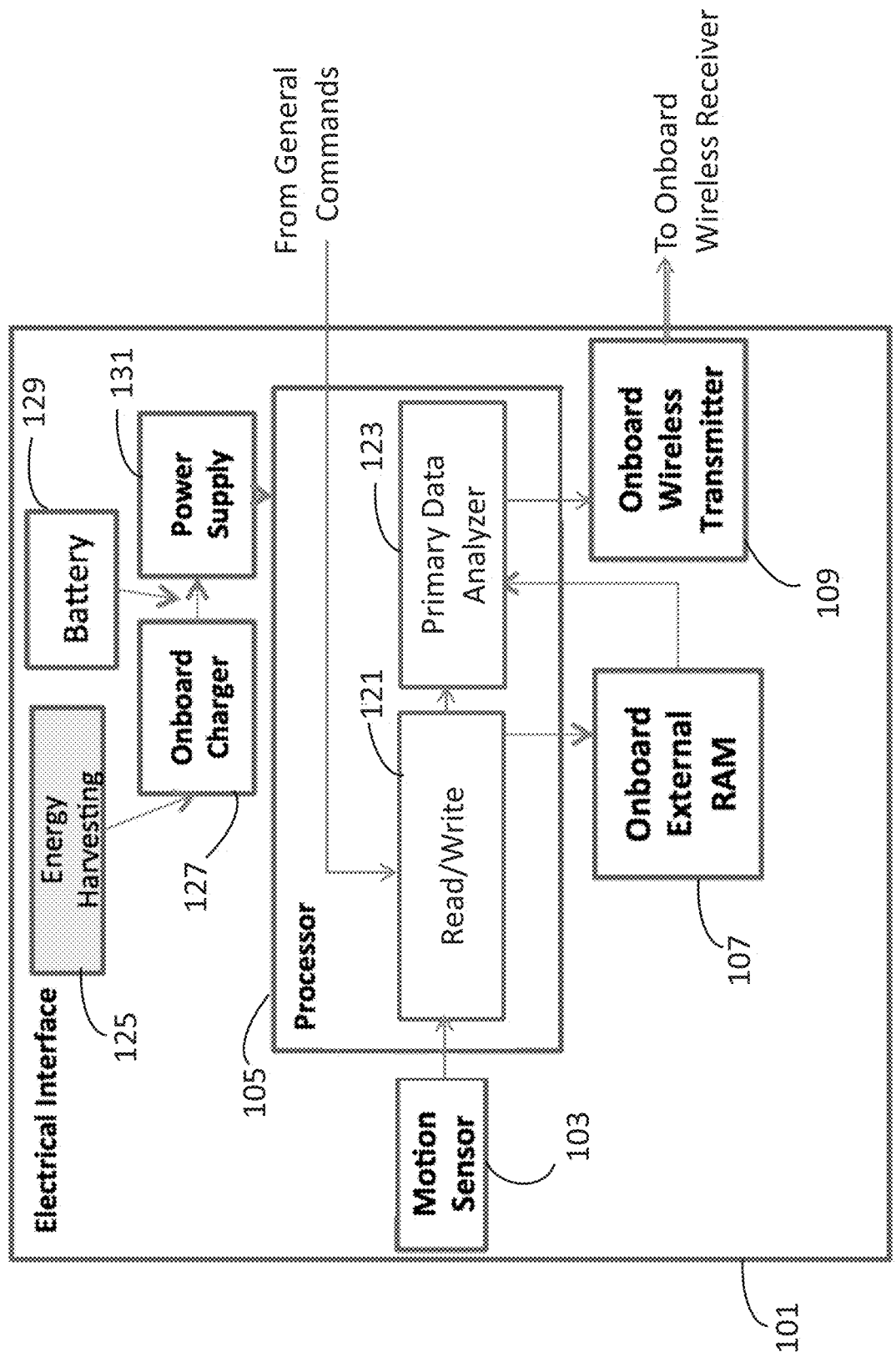
FIG. 13A shows the vibration monitoring system of the present invention.
Figure 13B:
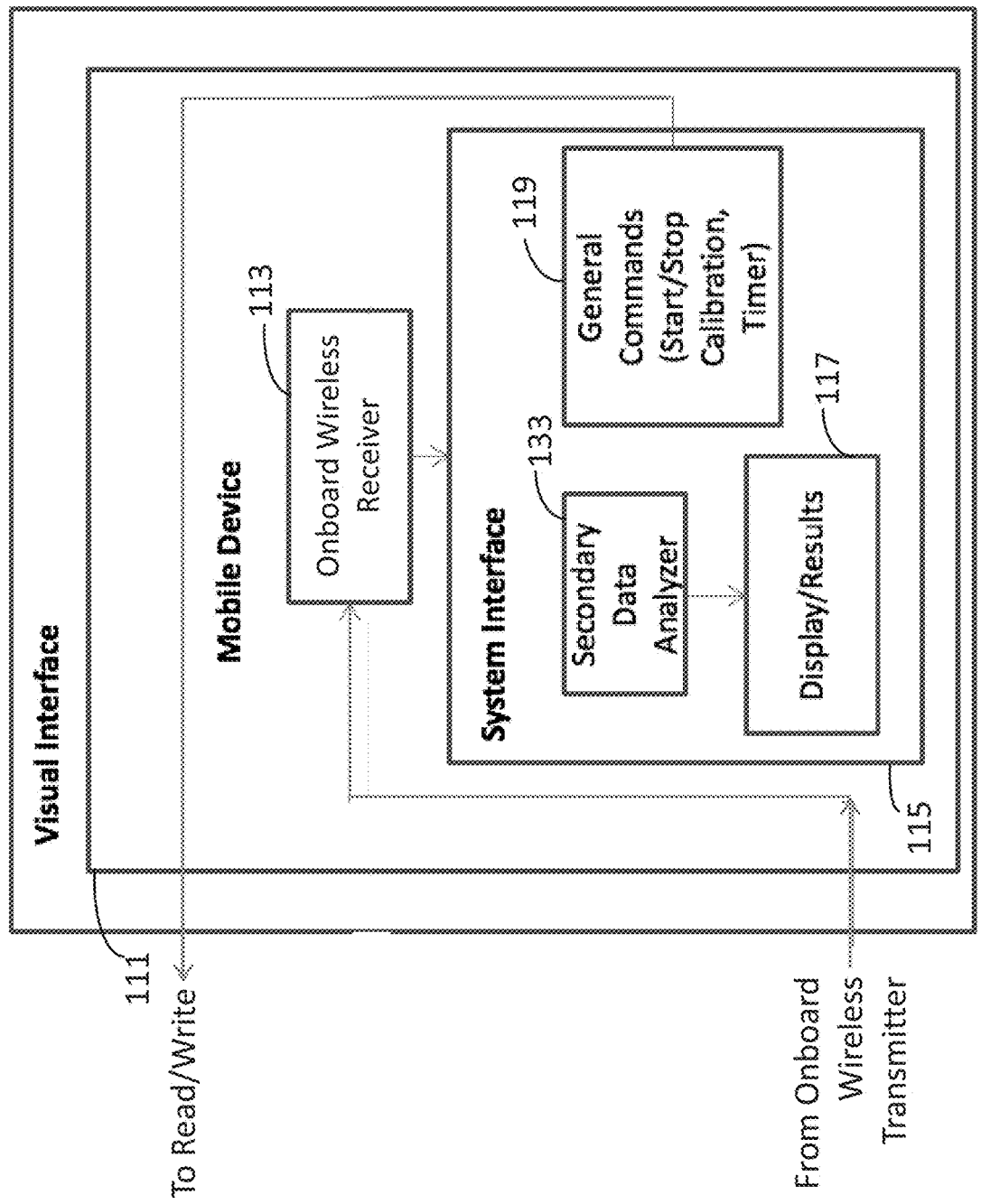
FIG. 13B shows the vibration monitoring system of the present invention.
Figure 14:
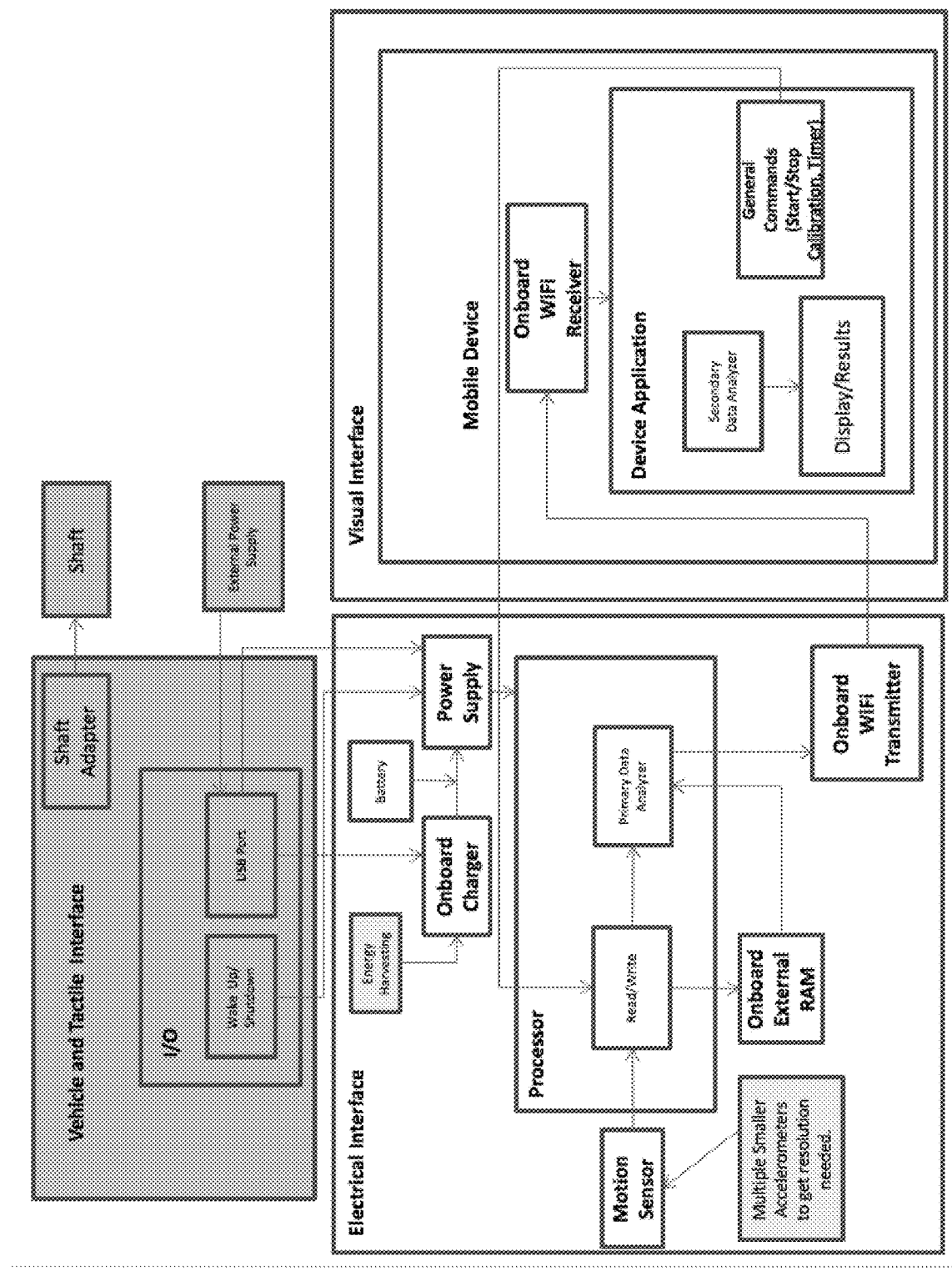
FIG. 14 shows an alternative embodiment of the present system featuring a removable interface.

Referring now to FIGS. 13A-14, the present invention features a vibration monitoring system integrated into a rotating system of an automotive engine for automating an identification of a faulty component in the rotating system. In preferred embodiments, the system is integrated into the automotive engine by the original equipment manufacturer. Each rotating component has a reference vibration signature characteristic of a normal vibration of the component while rotating. In some embodiments, the system comprises a mechanical housing (101), operatively coupled to a shaft of a rotating component of the rotating system. In other embodiments, the system further comprises an electronic device (111) having a system interface (115). In an embodiment, the electronic device (111) has a wireless receiver (113) and display (117). Nonlimiting examples of the electronic device (111) include, but are not limited to: a mobile device, for example, a mobile phone, tablet, etc.

In further embodiments, the mechanical housing (101) houses a motion sensor (103) comprising a plurality of accelerometers, a processor unit (105) operatively coupled to the motion sensor (103), a memory repository (107)

operatively coupled to the processor unit (105), and a wireless transmitter (109) operatively coupled to the processor unit (105). In an exemplary embodiment, the motion sensor comprises n accelerometers, each 360/n degrees out of phase, collecting motion data at a very high rate (e.g., about 10 kHz). In another embodiment, the memory repository (107) is a Random Access Memory data storage device.

In additional embodiments, the processor unit (105) comprises a temporary storage unit (121), operatively coupled to the motion sensor (103) and the memory repository (107), and a primary data analyzer (123), operatively coupled to the wireless transmitter (109) and the memory repository (107).

Consistent with previous embodiments, the system is integrated into the rotating system such that, when the automotive engine is in operation, vibrations generated by the rotating component are translated from the shaft to the motion sensor (103) via the mechanical housing (101). The plurality of accelerometers may then perform measurements of the vibrations. In some embodiments, these measurements are collected from the plurality of accelerometers by the temporary storage unit (121), which transmits the measurements to the memory repository (107). In other embodiments, the primary data analyzer (123) acquires the measurements from the memory repository (107) and performs a primary analysis. Results of this analysis may be sent to the wireless transmitter (109), along with the measurements, for transmission to the wireless receiver (113).

In further embodiments, the wireless receiver (113) acquires and subsequently transmits the measurements and the results to the system interface (115), which performs a secondary analysis of the measurements and the results to determine if the rotating component is faulty. In exemplary embodiments, this determination is based on a deviation of the vibration from the vibration signature of the rotating component. In additional embodiments, the display (117) provides a visual representation of data comprising whether the rotating component is faulty. In an exemplary embodiment, the primary and/or secondary analysis comprises processing and analyzing the measurements by applying any frequency based analysis. Some nonlimiting examples include, but are not limited to: a Fourier Analysis or a FFT.

In supplementary embodiments, the system interface (115) comprises a secondary data analyzer (133), operatively coupled to the display (117), for performing the secondary analysis; and a general commands module (119) operatively coupled to the temporary storage unit (121). In some embodiments, the general commands module (119) performs tasks including, but not limited to: determining when to start/stop performing measurements of the vibrations, setting time periods within which said measurements are performed, and calibrating the measurements acquired.

In some embodiments, a power supply (131) is operatively coupled to the processor unit (105) as a power source. In other embodiments, a battery (129) is operatively coupled to the power supply (131), an onboard charger (127) is operatively coupled to the battery (129), and an energy harvesting mechanism (125) is operatively coupled to the onboard charger (127). In an embodiment, the mechanism (125) harvests rotational energy generated by the shaft and converts this energy into electrical energy.

Consistent with previous embodiments, the energy harvesting mechanism (125) provides the electrical energy to the onboard charger (127), which controls a distribution of the electrical energy to the battery (129). The electrical energy thus charges the battery (129). In further embodiments, the battery (129) then transmits the electrical energy to the power supply (131), which steps the electrical energy to an appropriate voltage level, thus providing a suitable power level to the processor unit (105).

In an alternative embodiment, the present system further comprises a removable vehicle and tactile interface (see FIG. 2). In some embodiments, this interface comprises: a wake-up/shutdown button operatively coupled to the power supply (131); an electrical port operatively coupled to the onboard charger (127), the power supply (131), and an external power supply; and a shaft adapter coupled to the shaft of the rotating component. In this configuration, the wake-up/shutdown button determines when power is provided to the electrical interface. In other embodiments, the external power supply provides electrical energy to the onboard charger (127) for charging the battery (129). In preferred embodiments, the electrical port is a Universal Serial Bus ("USB") port. In exemplary embodiments, there are two voltage steps for the present system: stepping the voltage from the battery (129) and onboard charger (127) to the power supply (131) appropriately and stepping the voltage from the USB port to the power supply (131) appropriately.

Figure 15A:
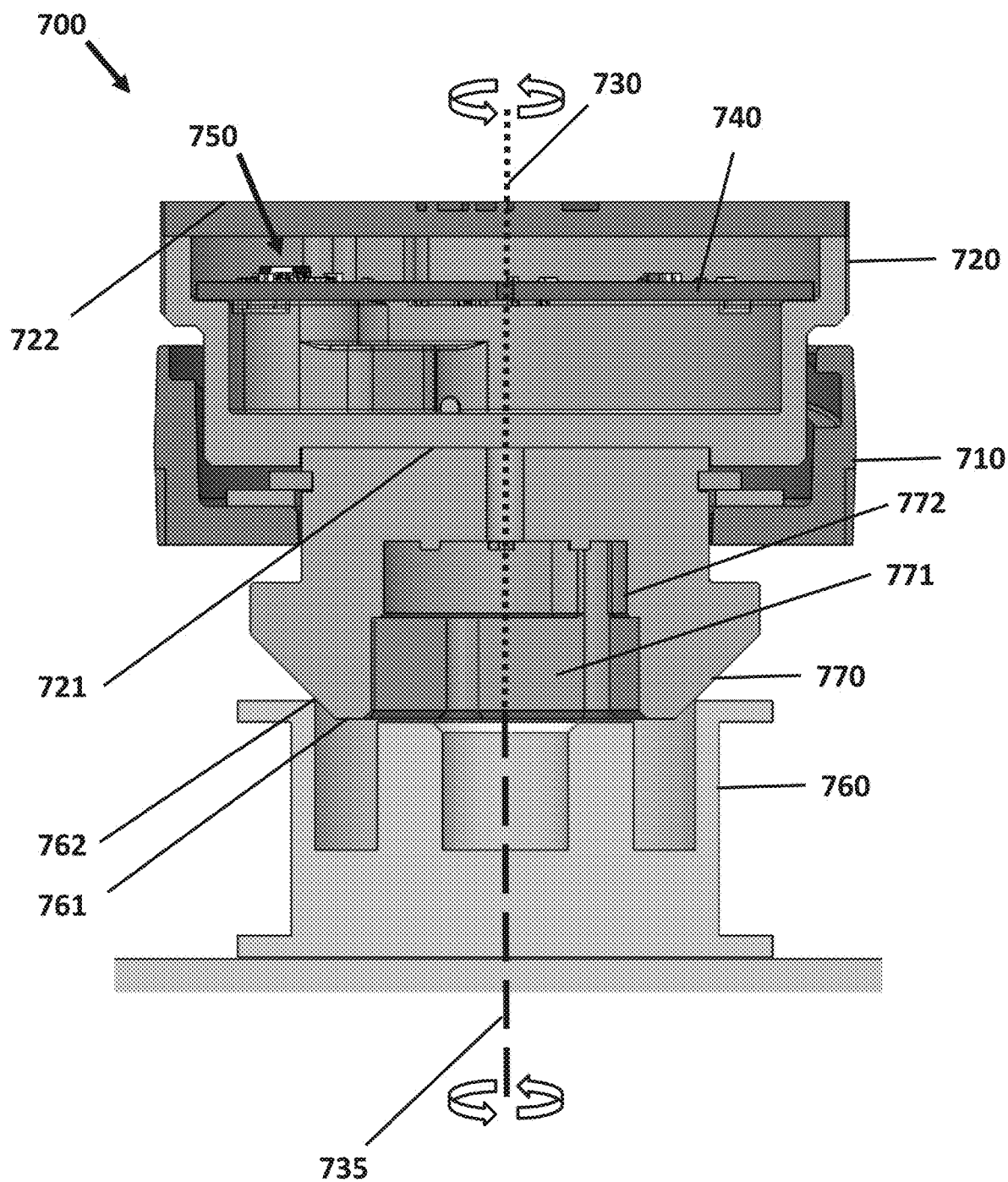
FIG. 15A is a schematic drawing which shows an embodiment of the present invention in which a vibration monitoring device is attached to a rotating pulley by a conical mounting adapter.
Figure 15B:
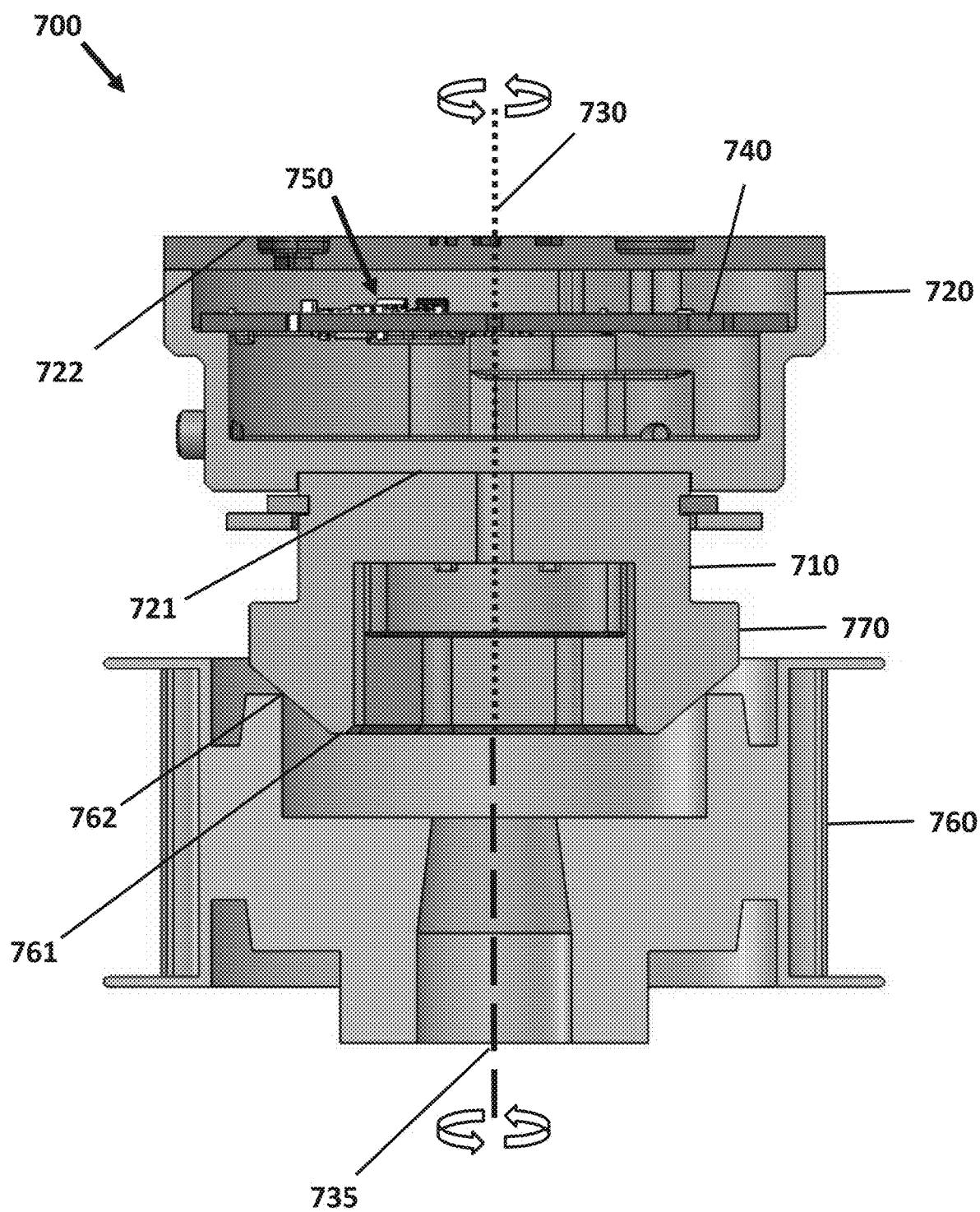
FIG. 15B is a schematic drawing which shows an embodiment of the present invention in which a vibration monitoring device is attached to a rotating pulley by a conical mounting adapter.
Figure 15C:
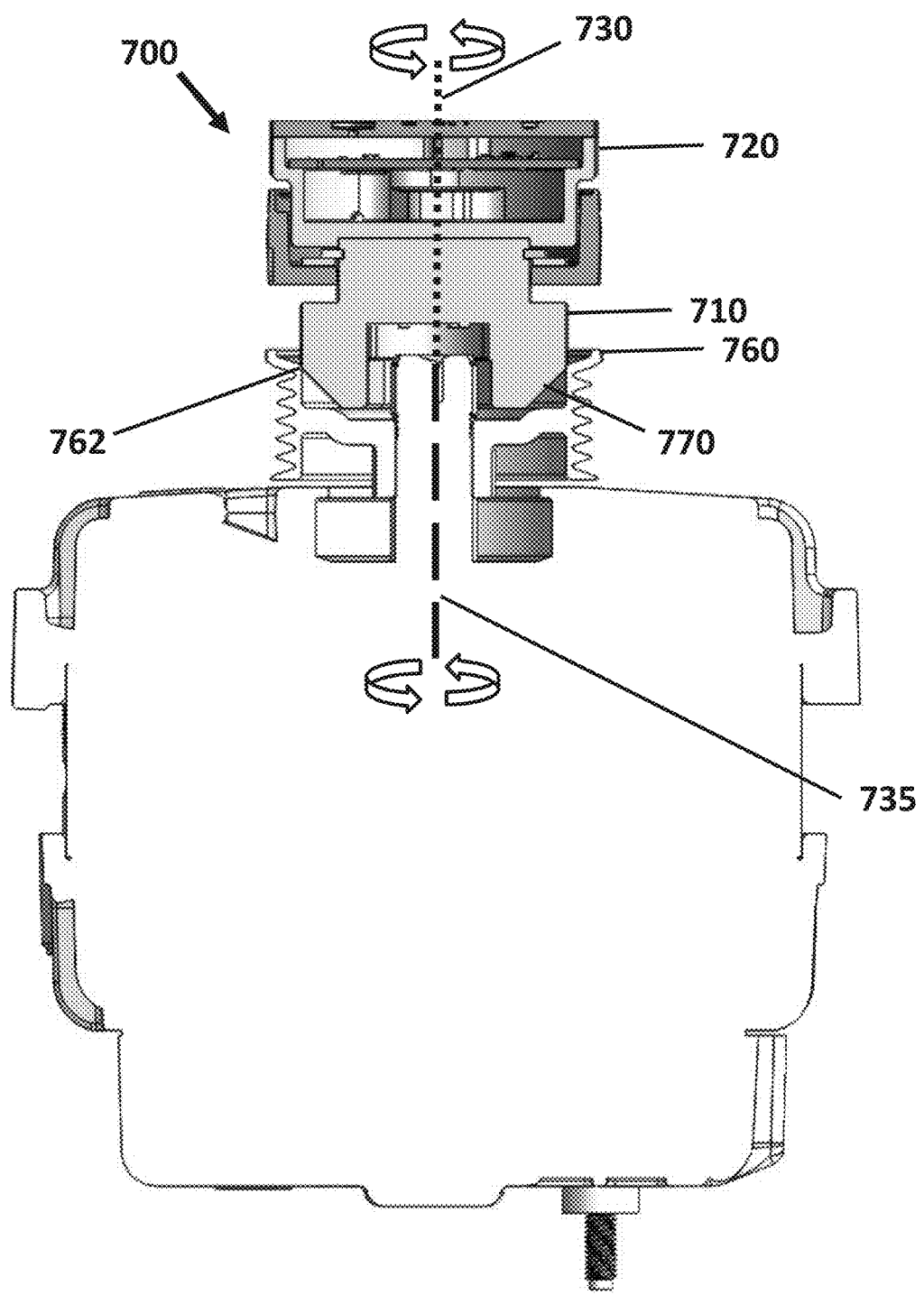
FIG. 15C is a schematic drawing which shows an embodiment of the present invention in which a vibration monitoring device is attached to a rotating pulley by a conical mounting adapter.
Figure 16A:
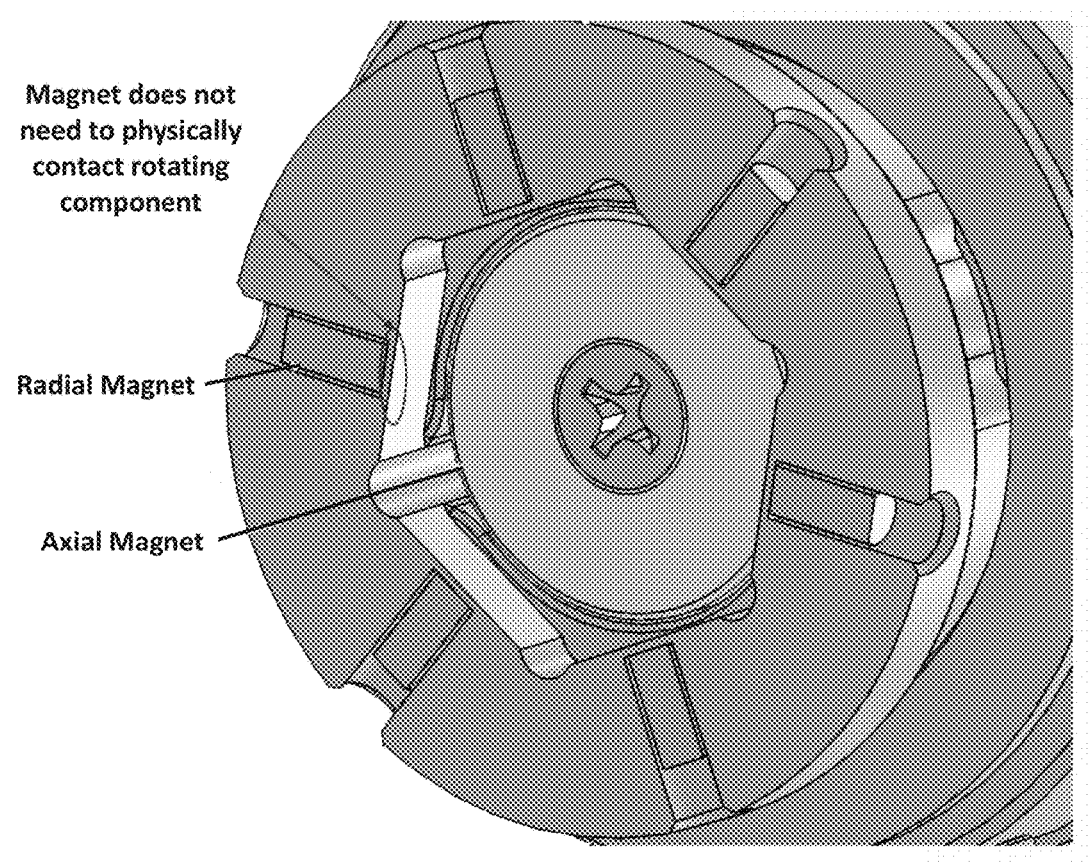
FIG. 16A is a schematic drawing which shows an embodiment of the present invention in which a vibration monitoring device is attached to a rotating pulley by a combination of radial and axial magnets.
Figure 16B:
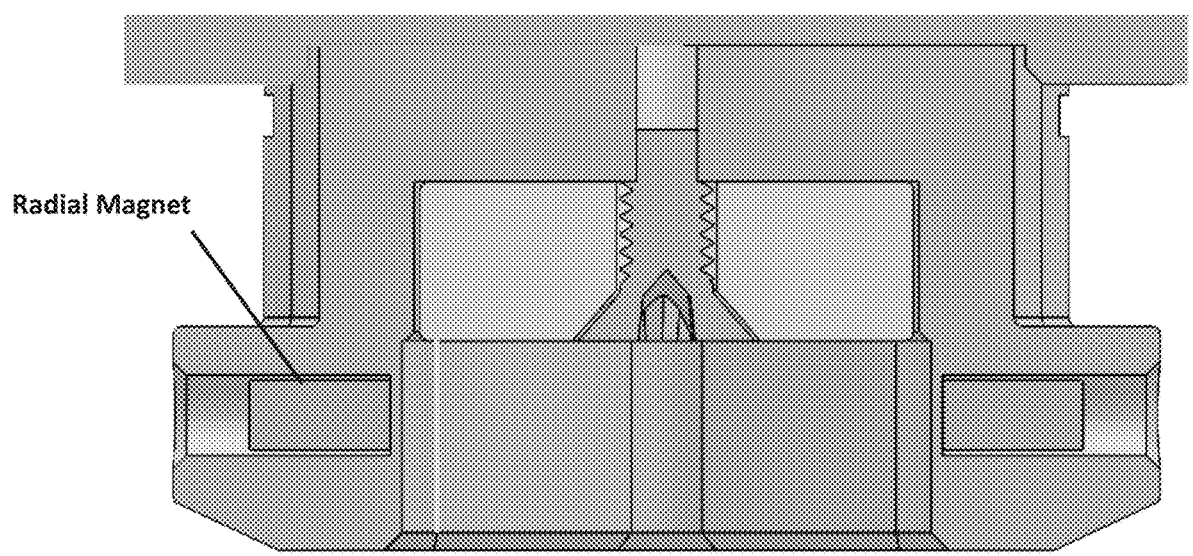
FIG. 16B is a schematic drawing which shows an embodiment of the present invention in which a vibration monitoring device is attached to a rotating pulley by radial magnets.

Referring now to FIG. 15A and FIG. 15B, an embodiment of the present invention may comprise a vibration monitoring device (700) for identifying a faulty component in a rotating system which includes a rotating component (760). In one embodiment, the device (700) may comprise a device base (710); a housing (720), a support platform (740); and a motion sensor (750). In some embodiments, the housing (720) may comprise a first end (721), attached to the device base (710), a second end (722), and a first rotational axis (730) passing through the two ends. In other embodiments, the device base (710) may be configured for attachment to a distal end (761) of the rotating component (760), such that the first rotational axis (730) is coaxial with a second rotational axis (735) of the rotating component. In another embodiment, the support platform (740) may have two parallel faces and be disposed within the housing (720) such that the faces are orthogonal to the first rotational axis (730). In yet another embodiment, the motion sensor (750) may comprise a set of accelerometers (755) disposed on the support platform (740) and concentrically positioned about the rotational axis (730) of the device (700) such that the accelerometers (755) are equally spaced about the rotational axis (730). As a non-limiting example, the rotating system may be an automobile engine.

In an embodiment, the present invention may feature a rotating system configured for identification of a faulty component. In another embodiment, the present invention may feature a method for identifying a faulty component in a rotating system. As a non-limiting example, the method may comprise: providing a vibration monitoring device (700); attaching the vibration device (700) to the distal end (610) of the rotating component (760) such that the first rotational axis (730) is coaxial with a second rotational axis (735) of the rotating component (760); rotating the component (700) such that it produces one or more vibrations which are detected by the motion sensor (750); measuring the vibrations by the motion sensor (750) to detect a vibration signal; and analyzing the vibration signal, wherein the analysis is effective for the identification of the faulty component.

In alternative embodiments, the vibration detection device may be attached to a position other than the end of the rotating component. As a non-limiting example, the vibration detection device may be attached near the end, on the side, inside, around, at a midpoint, near a midpoint, or at a position along the length of the rotating component. As another non-limiting example, the vibration detection device may be operatively connected to the rotating component instead of being directly connected.

In one embodiment, the component (760) may produce one or more vibrations, as it rotates, which are measured by the motion sensor (750). In a preferred embodiment, measurement of the one or more vibrations may be effective for the detection of a vibration signal, and an analysis of the vibration signal may be effective for the identification of the faulty component.

In another embodiment, the support platform (470) may be a printed circuit board (PCB). In some embodiments, the PCB may comprise a processor unit operatively coupled to the set of accelerometers (755) and a memory repository operatively coupled to the processor unit. In other embodiments, the PCB may comprise a wireless transmitter operatively coupled to the processor unit, and a wireless receiver unit, in communication with the wireless transmitter. In yet another embodiment, the processor unit may perform a primary analysis of the vibration signal to yield a primary result which is wirelessly communicated by the transmitter to the receiver before a secondary analysis is preformed to determine if the component is faulty.

According to some embodiments, the component (760) may have a reference vibration signature and the analysis may identify a difference between the reference vibration signature and the vibration signal. In one embodiment, the vibration signal may be converted from an analog signal to a digital signal. In another embodiment, a Fourier Analysis or a Fast Fourier Transform (FFT) may apply to the vibration signal.

According to a preferred embodiment, the device base (710) may comprise a base magnet for magnetic attachment of the device (700) to a metal portion of the rotating component (760). In another preferred embodiment, the rotating component (760) may be a pulley and the device (700) may comprise a conical mounting adapter (770) which fits within a rim (762) of the pulley. In one embodiment, the adapter (770) may be seated such that the device (700) and the pulley are parallel. In another embodiment, the adapter (770) may be attached to the device base (710) using an attachment ring (715). In yet another embodiment, the rotating component (760) may be a shaft.

In some embodiments, the component (760) may comprise a male component (771) which mates with a female slot (772) of the adapter (770) in order to align the device (700) and the component (760). In another embodiment, an alignment aide (400) may be used to position the device onto the center of an accessible end of the rotating component (760). As a non-limiting example, the alignment aide (400) may comprise a ring (405) having a center aperture (404), and a plurality of hinged spring-loaded arms (401) disposed equidistantly on the ring (405) which are expandable and retractable. In one embodiment, the hinged spring-loaded arms (401) may expand and retract concentrically to contact a circumference of the device (700), such that the center aperture (404) aides in aligning the device (700) with the center of the rotating component (760).

In further embodiments, the housing (720) may be attached to the device base (710) via mating threads, screws, or a bayonet-latch mechanism. In other embodiments, the device base (710) may be attached to the rotating component using a hook and loop pad. In still other embodiments, the device base (710) may comprise a threaded nut allowing attachment to the rotating component (760) by replacement of an existing nut. In alternative embodiments, the device (700) may be integrated into the rotating system by an original equipment manufacturer. In one embodiment, an energy harvesting mechanism may harvest a rotational energy generated by the rotating component (760) and convert said rotational energy into an electrical energy which powers the device.

As used herein, the term "about" refers to plus or minus 10% of the referenced number.

The disclosures of the following U.S. patents are incorporated in their entirety by reference herein: U.S. Pat. Nos. 4,646,754, 9,188,498, 6,363,303, U.S. Pat. Application No. 2014/0174186, and U.S. Pat. Application No. 2007/0063048.

Various modifications of the invention, in addition to those described herein, will be apparent to those skilled in the art from the foregoing description. Such modifications are also intended to fall within the scope of the appended claims. Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A vibration monitoring device (700) for identifying a faulty component in a rotating system, wherein the rotating system comprises a rotating component (760), the device (700) comprising:
   (a) a device base (710), configured for attachment to a distal end (761) of the rotating component (760);
   (b) a housing (720) comprising:
      i. a first end (721), attached to the device base (710);
      ii. a second end (722); and
      iii. a first rotational axis (730) passing through the the first end (721) and the second end (722);
   (c) a support platform (740) having two parallel faces, the platform (740) disposed within the housing (720) such that the faces are orthogonal to the first rotational axis (730);
   (d) a motion sensor (750) comprising a set of accelerometers (755) disposed on the support platform (740);
   wherein the device (700) is attached to the distal end (761) of the rotating component (760) such that the first rotational axis (730) is coaxial with a second rotational axis (735) of the rotating component (760),
   wherein as the component (760) rotates, it produces one or more vibrations which are measured by the motion sensor (750),
   wherein measurement of the one or more vibrations is effective for the detection of a vibration signal,
   wherein an analysis of the vibration signal is effective for the identification of the faulty component,
   wherein the rotating component (760) is a pulley, and
   wherein the device (700) comprises a conical mounting adapter (770) which fits within a rim (762) of the pulley, wherein the adapter (770) is seated such that the device (700) and the pulley are parallel.

2. A vibration monitoring device (700) for identifying a faulty component in a rotating system, wherein the rotating system comprises a rotating component (760), the device (700) comprising:
   (a) a device base (710), configured for attachment to a distal end (761) of the rotating component (760);
   (b) a housing (720) comprising:
      i. a first end (721), attached to the device base (710);
      ii. a second end (722); and
      iii. a first rotational axis (730) passing through the the first end (721) and the second end (722);
   (c) a support platform (740) having two parallel faces, the platform (740) disposed within the housing (720) such that the faces are orthogonal to the first rotational axis (730);
   (d) a motion sensor (750) comprising a set of accelerometers (755) disposed on the support platform (740);
   wherein the device (700) is attached to the distal end (761) of the rotating component (760) such that the first rotational axis (730) is coaxial with a second rotational axis (735) of the rotating component (760),
   wherein as the component (760) rotates, it produces one or more vibrations which are measured by the motion sensor (750),
   wherein measurement of the one or more vibrations is effective for the detection of a vibration signal,
   wherein an analysis of the vibration signal is effective for the identification of the faulty component,
   wherein the device (700) comprises a conical mounting adapter (770) which fits within a rim (762) of the rotating component (760), and
   wherein the adapter (770) is attached to the device base (710) using an attachment ring (715).

3. A vibration monitoring device (700) for identifying a faulty component in a rotating system, wherein the rotating system comprises a rotating component (760), the device (700) comprising:
   (a) a device base (710), configured for attachment to a distal end (761) of the rotating component (760);
   (b) a housing (720) comprising:
      i. a first end (721), attached to the device base (710);
      ii. a second end (722); and
      iii. a first rotational axis (730) passing through the two ends the first end (721) and the second end (722);
   (c) a support platform (740) having two parallel faces, the platform (740) disposed within the housing (720) such that the faces are orthogonal to the first rotational axis (730);
   (d) a motion sensor (750) comprising a set of accelerometers (755) disposed on the support platform (740);
   wherein the device (700) is attached to the distal end (761) of the rotating component (760) such that the first rotational axis (730) is coaxial with a second rotational axis (735) of the rotating component (760),
   wherein as the component (760) rotates, it produces one or more vibrations which are measured by the motion sensor (750),
   wherein measurement of the one or more vibrations is effective for the detection of a vibration signal,
   wherein an analysis of the vibration signal is effective for the identification of the faulty component,
   wherein the device (700) comprises a conical mounting adapter (770) which fits within a rim (762) of the rotating component (760), and
   wherein the rotating component (760) comprises a male component (771) which mates with a female slot (772) of the adapter (770) in order to align the device (700) and the component (760).

4. A vibration monitoring device (700) for identifying a faulty component in a rotating system, wherein the rotating system comprises a rotating component (760), the device (700) comprising:
   (a) a device base (710), configured for attachment to a distal end (761) of the rotating component (760);
   (b) a housing (720) comprising:
      i. a first end (721), attached to the device base (710);
      ii. a second end (722); and
      iii. a first rotational axis (730) passing through the the first end (721) and the second end (722);
   (c) a support platform (740) having two parallel faces, the platform (740) disposed within the housing (720) such that the faces are orthogonal to the first rotational axis (730);
   (d) a motion sensor (750) comprising a set of accelerometers (755) disposed on the support platform (740);
   wherein the device (700) is attached to the distal end (761) of the rotating component (760) such that the first rotational axis (730) is coaxial with a second rotational axis (735) of the rotating component (760),
   wherein as the component (760) rotates, it produces one or more vibrations which are measured by the motion sensor (750),
   wherein measurement of the one or more vibrations is effective for the detection of a vibration signal,
   wherein an analysis of the vibration signal is effective for the identification of the faulty component,
   wherein an alignment aide (400) is used to position the device onto the center of an accessible end of the rotating component (760),
   wherein the alignment aide (400) comprises a ring (405) having a center aperture (404), and a plurality of hinged spring-loaded arms (401) disposed equidistantly on the ring (405) which are expandable and retractable, and
   wherein to attach the device (700) to the center of the accessible end of the rotating component (760), the hinged spring-loaded arms (401) expand and retract concentrically to contact a circumference of the device (700), wherein the center aperture (404) aides in aligning the device (700) with the center of the rotating component (760).

* * * * *